United States Patent
Boyd et al.

(10) Patent No.: US 6,368,447 B1
(45) Date of Patent: Apr. 9, 2002

(54) METHOD FOR ASSEMBLING CRITICALLY POSITIONED CAMERA COMPONENT ON CAMERA BODY

(75) Inventors: James D. Boyd, Rochester; Stephen J. Smith, Shortsville; Michael P. Cramer, Victor, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/360,576

(22) Filed: Jul. 26, 1999

(51) Int. Cl.[7] .................. B32B 31/00; B65C 1/02
(52) U.S. Cl. ............... 156/249; 156/247; 156/285; 156/DIG. 2
(58) Field of Search ................. 156/247, 249, 156/230, 285, 277, DIG. 2, DIG. 31, DIG. 38

(56) References Cited

U.S. PATENT DOCUMENTS

| | | |
|---|---|---|
| 3,273,478 A | 9/1966 | Kinder |
| 4,540,265 A | 9/1985 | Harvey |
| 4,556,443 A * | 12/1985 | Moya |
| 4,581,094 A * | 4/1986 | Sato |
| 4,972,649 A | 11/1990 | Mochida et al. |
| 5,068,575 A | 11/1991 | Dunsmore et al. |
| 5,235,366 A | 8/1993 | Kucmerowski |
| 5,472,543 A | 12/1995 | Yokajity |
| 5,557,356 A | 9/1996 | Ishida et al. |
| 5,614,975 A | 3/1997 | SanGregory et al. |
| 5,652,930 A | 7/1997 | Teremy et al. |
| 5,660,663 A * | 8/1997 | Chamberlain et al. |
| 5,761,542 A | 6/1998 | Lamphron et al. |
| 5,853,530 A * | 12/1998 | Allen |
| 5,867,102 A * | 2/1999 | Souder et al. |
| 5,873,002 A | 2/1999 | Glanville, Sr. et al. |
| 5,897,741 A * | 4/1999 | Mills et al. |
| 6,123,796 A * | 9/2000 | Kathmann et al. .......... 156/249 |
| 6,259,861 B1 * | 7/2001 | Boyd et al. |
| 6,278,841 B1 * | 8/2001 | Boyd et al. |
| 6,282,374 B1 * | 8/2001 | Boyd et al. |
| 6,282,375 B1 * | 8/2001 | Boyd et al. |

FOREIGN PATENT DOCUMENTS

| | | |
|---|---|---|
| JP | 5134361 | 5/1993 |
| JP | 7114147 | 5/1995 |

* cited by examiner

*Primary Examiner*—Curtis Mayes
(74) *Attorney, Agent, or Firm*—Robert Luke Walker

(57) ABSTRACT

In a method for assembling, a component is critically positioned on a larger body, such as a camera. The component is joined to a predetermined attachment area of a support sheet. The support sheet is floated into alignment with a labeler head. The labeler head is positioned in alignment with a predetermined location on the body. The body is contacted with the support sheet and the component while maintaining the alignments. A camera can be maintained light-tight during the joining, floating, positioning, and contacting steps.

32 Claims, 30 Drawing Sheets

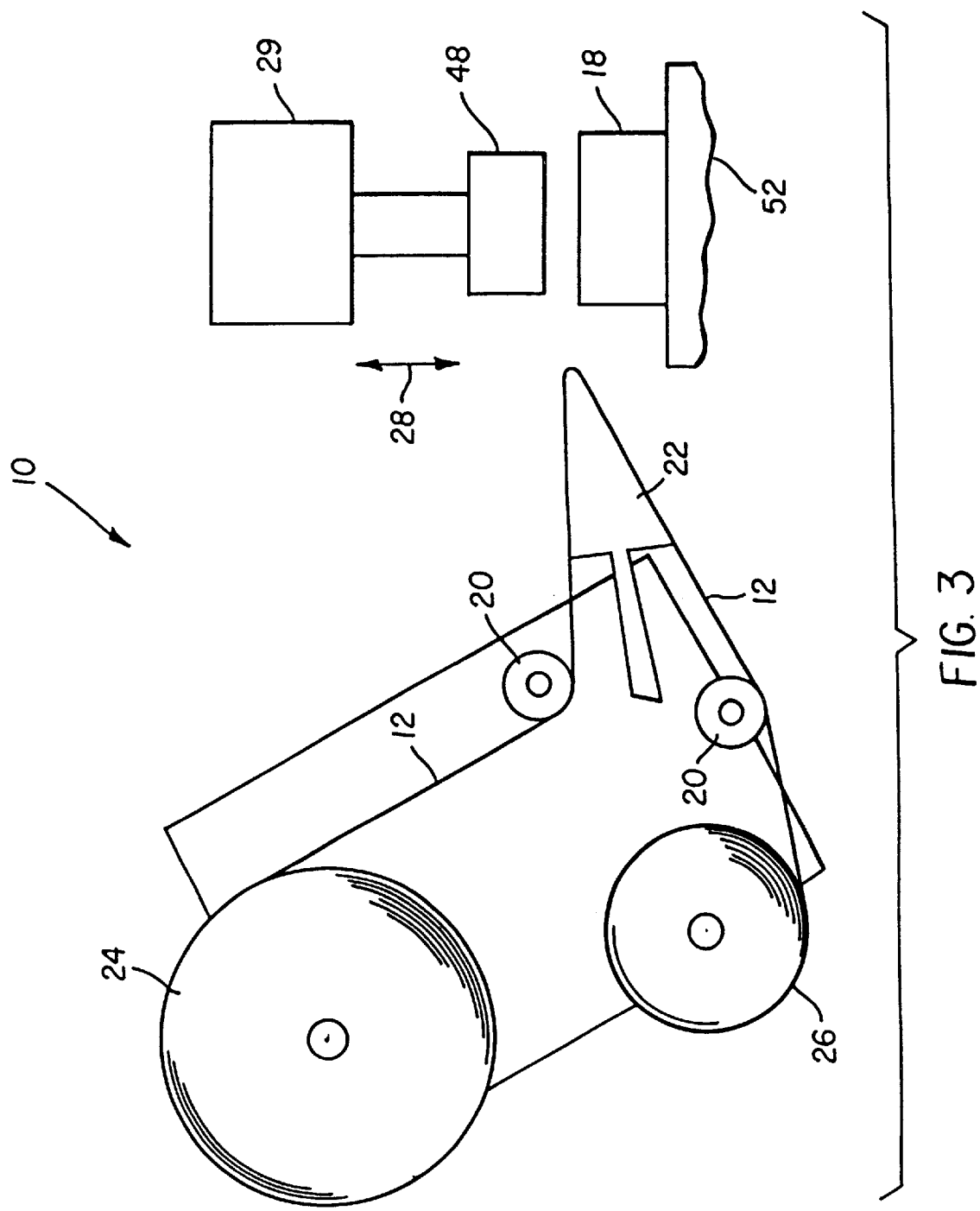

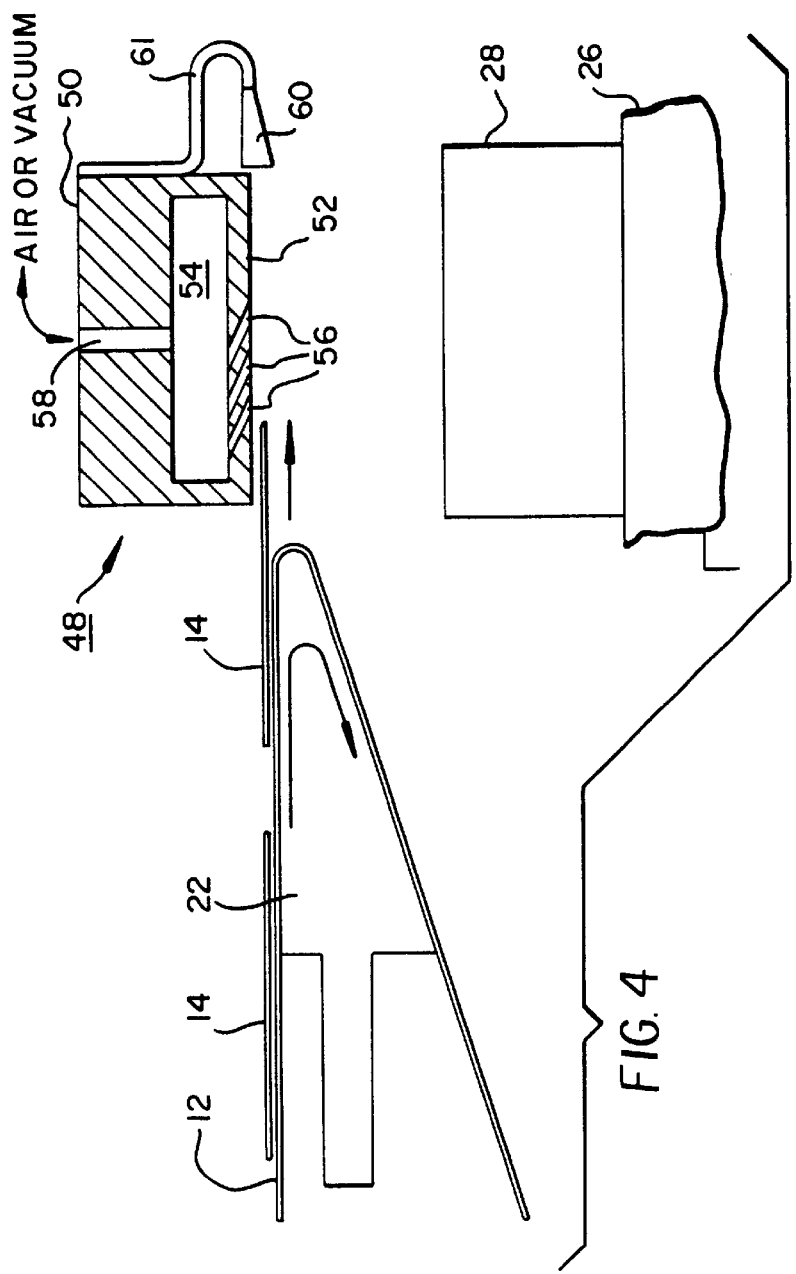
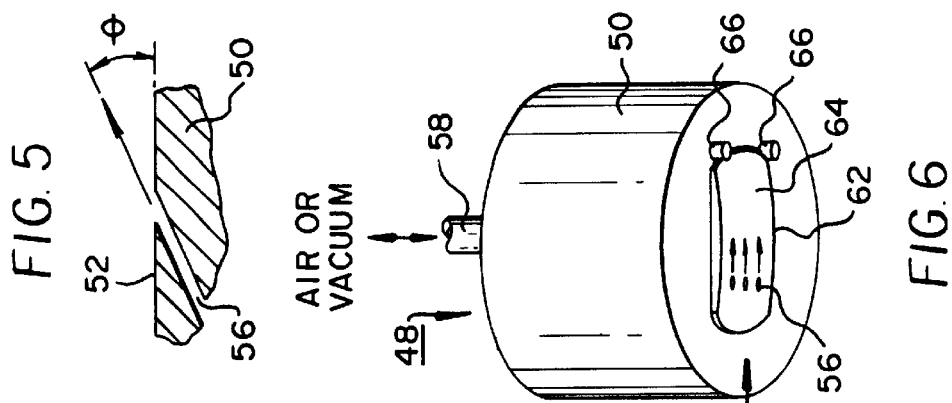
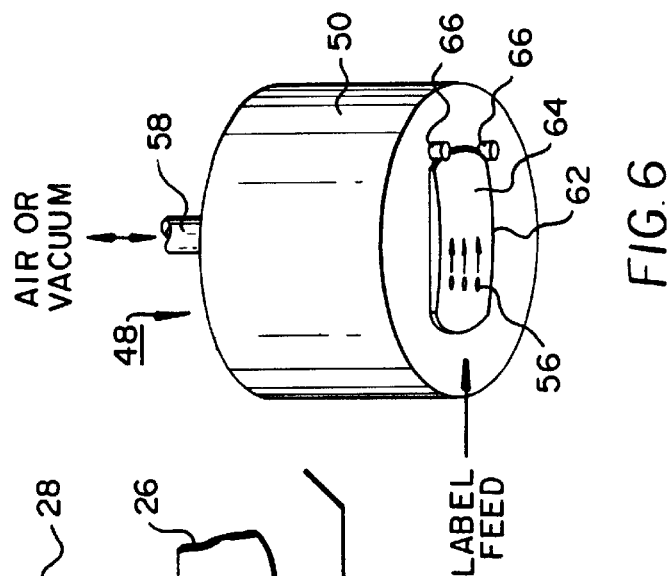
FIG. 5
FIG. 6
FIG. 4

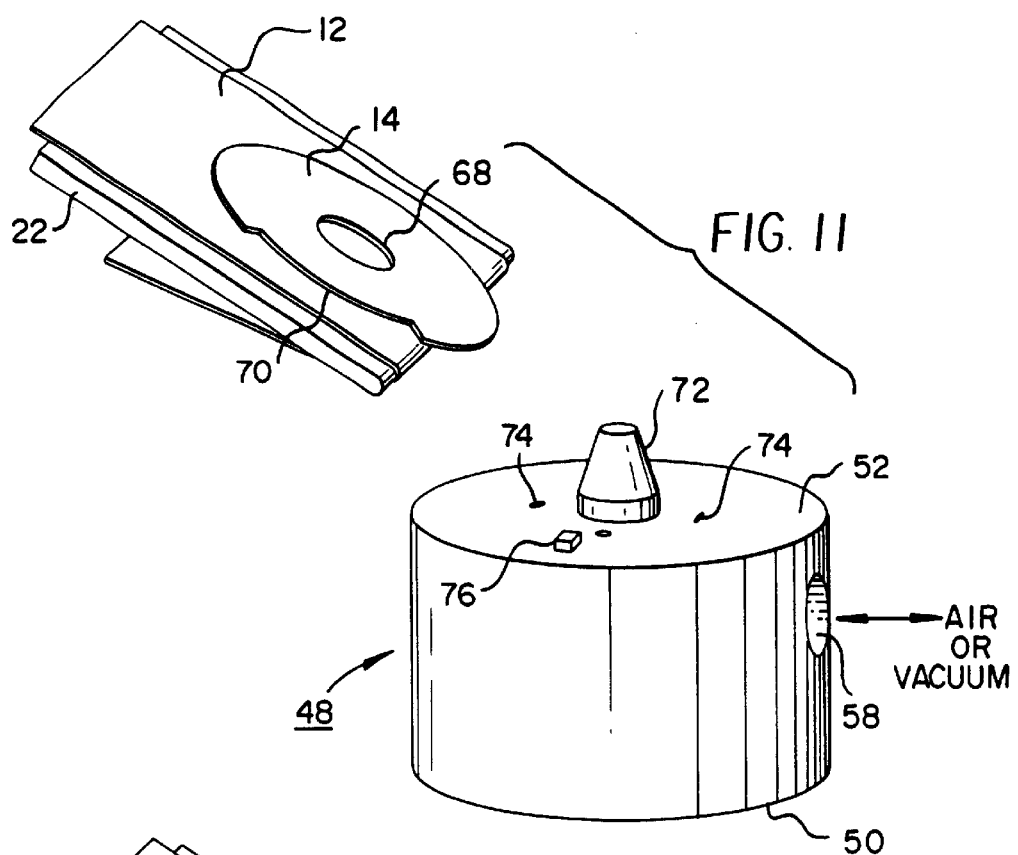
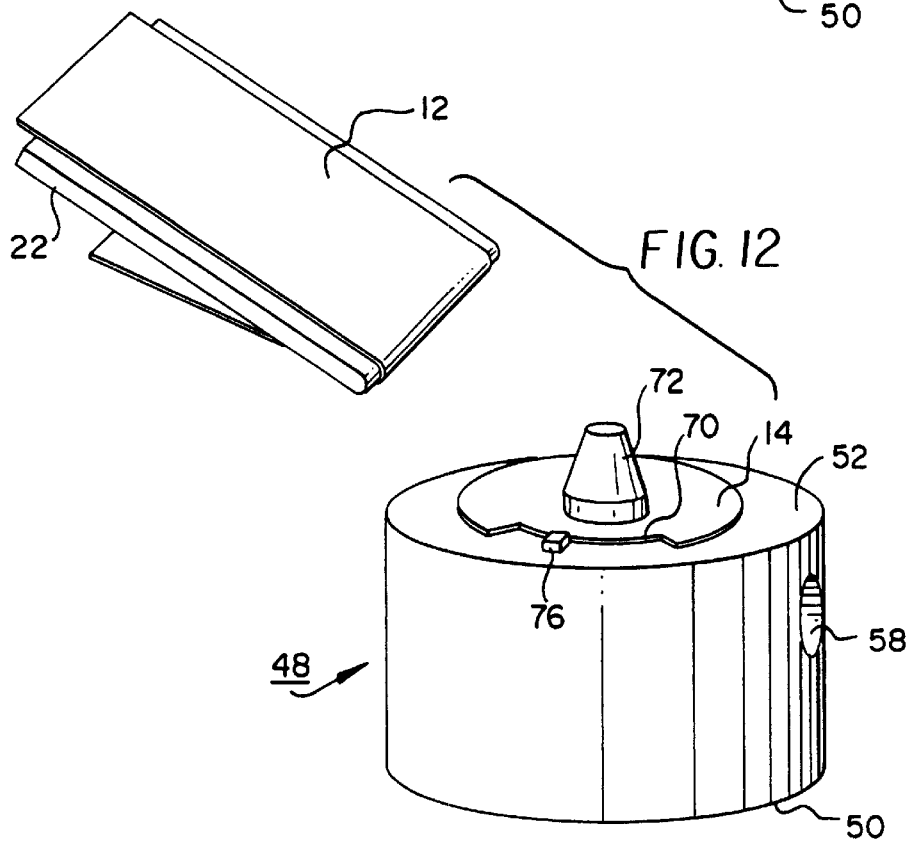

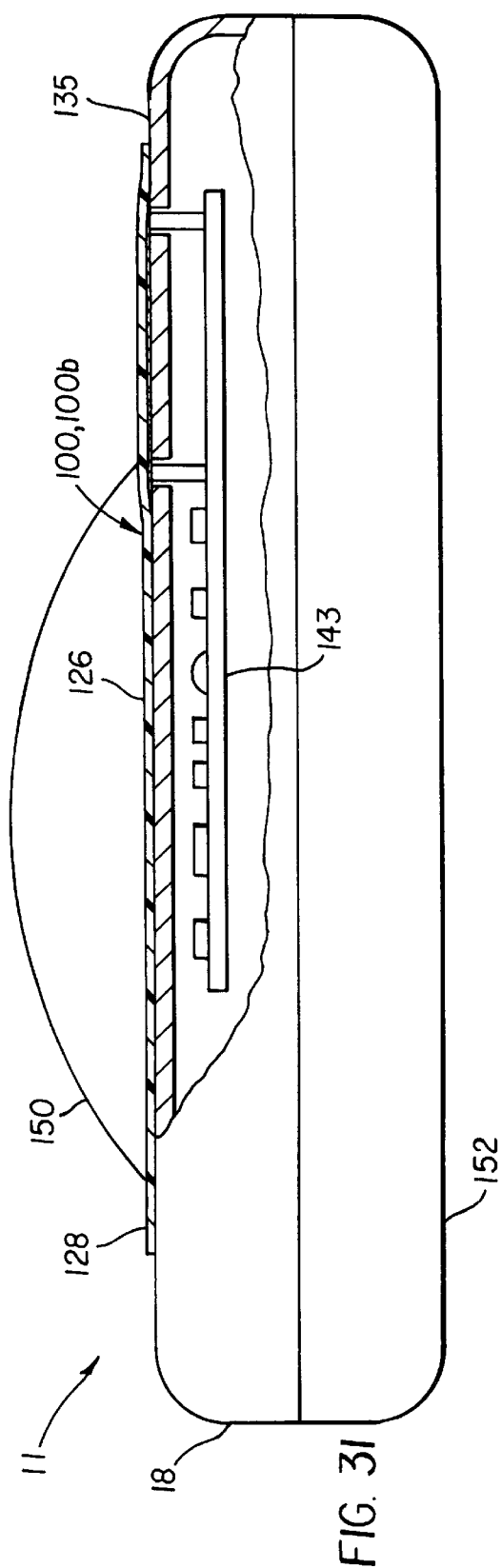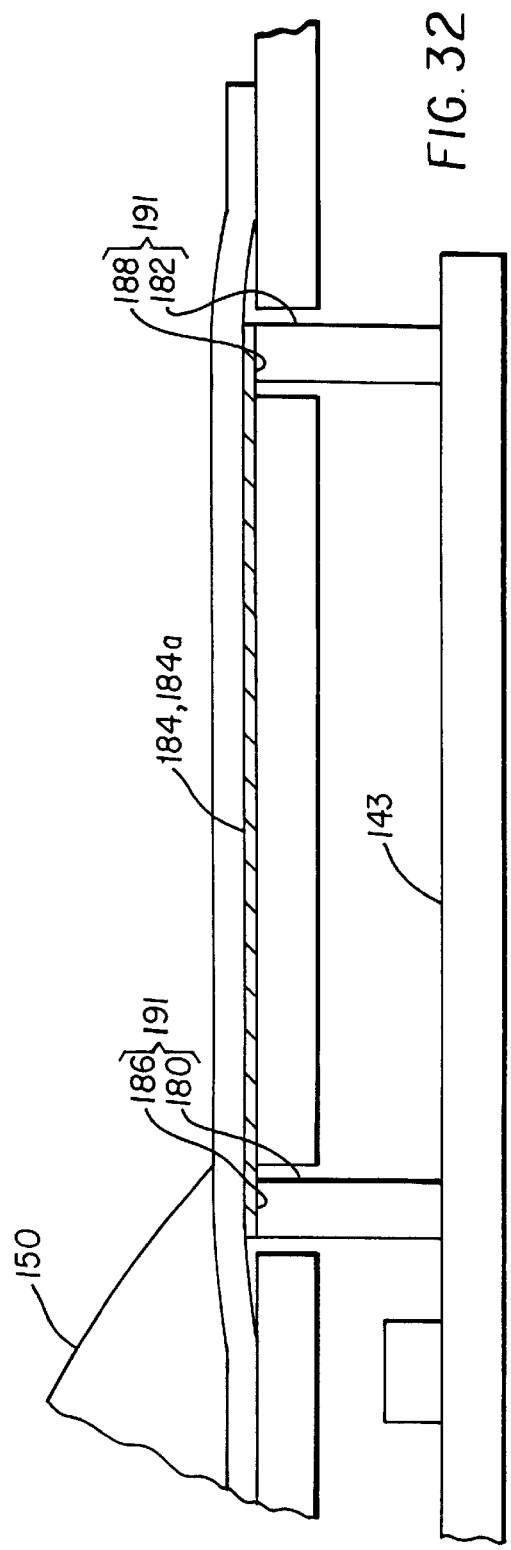

METHOD FOR ASSEMBLING CRITICALLY POSITIONED CAMERA COMPONENT ON CAMERA BODY

CROSS REFERENCE TO RELATED APPLICATIONS

Reference is made to commonly assigned, co-pending U.S. patent applications Ser. No. 09/360,432, entitled: CAMERA HAVING RESILIENTLY BIASING LABEL AND METHOD, filed Jul. 26, 1999, in the names of James D. Boyd, Stephen J. Smith, and Michael P. Cramer; Ser. No. 09/361,057, entitled: CAMERA HAVING LABEL MOUNTED ELECTRICAL COMPONENT, filed Jul. 26, 1999, in the names of James D. Boyd, Stephen J. Smith, and Michael P. Cramer; Ser. No. 09/360,909, entitled: CAMERA HAVING LIGHT-BLOCKING LABEL, filed Jul. 26, 1999, in the names of James D. Boyd, Stephen J. Smith, and Michael P. Cramer; Ser. No. 09/361,637, entitled: CAMERA HAVING LABEL INCLUDING OPTICAL COMPONENT, filed Jul. 26, 1999, in the names of James D. Boyd, Stephen J. Smith, and Michael P. Cramer; Ser. No. 09/360,908, entitled: ONE-TIME USE CAMERA HAVING BREAKABLE COMPONENT AND RECYCLING METHOD, filed Jul. 26, 1999, in the names of James D. Boyd, Stephen J. Smith, and Michael P. Cramer; Ser. No. 09/360,752, entitled: CAMERA HAVING LABEL-STOPPED OPTICAL SYSTEM, filed Jul. 26, 1999, in the names of James D. Boyd, Stephen J. Smith, and Michael P. Cramer; Ser. No. 09/361,056, entitled: ONE-TIME USE CAMERA LOADING METHOD, filed Jul. 26, 1999, in the names of James D. Boyd, Stephen J. Smith, and Michael P. Cramer each of which are assigned to the assignee of this application.

FIELD OF THE INVENTION

The invention relates to techniques and equipment for assembling products such as cameras and more particularly relates to a method for assembling a critically positioned camera component on a camera body.

BACKGROUND OF THE INVENTION

U.S. Pat. No. 5,472,543 entitled "Method for Label Application Using Bernoulli Effect", which is hereby incorporated herein by reference, discloses a labeling method in which a label is floated on an air cushion into a substantially exact alignment with an area of an item receiving the label. It has been determined that this method is very efficient and the precision of label placement provided by this method is very great.

Cameras conventionally use a large number of components that are individual pieces which must be separately assembled with the rest of the camera. Precise positioning of these components is generally a function of other support structures.

It would thus be desirable to provide an improved assembly method in which a component is preassembled with a support sheet, such as a label, and is then precisely positioned on a body.

SUMMARY OF THE INVENTION

The invention is defined by the claims. The invention, in its broader aspects, provides a method for assembling, in which a component is critically positioned on a larger body, such as a camera. The component is joined to a predetermined attachment area of a support sheet. The support sheet is floated into alignment with a labeler head. The labeler head is positioned in alignment with a predetermined location on the body. The body is contacted with the support sheet and the component while maintaining the alignments. A camera can be maintained light-tight during the joining, floating, positioning, and contacting steps.

It is an advantageous effect of at least some of the embodiments of the invention that an improved assembly method is provided, in which a component is preassembled with a support sheet, such as a label, and is then precisely positioned on a body.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 3 is a diagrammatical view of a Bernoulli labeller suitable for use in the method of FIG. 1.

FIG. 4 shows schematically a first embodiment of the labeler head of the labeller of FIG. 3.

FIG. 5 shows a fragmentary sectional view of the labeler head of FIG. 6, indicating the orientation of the bores for the gas jets.

FIG. 6 shows a perspective view of a second embodiment of the labeler head.

FIGS. 11–14 show perspective views, some in section, of a fourth embodiment of the labeler head.

FIG. 31 is a partially cut-away bottom plan view of the camera of FIG. 30.

FIG. 32 is a partial enlargement of the view of FIG. 31.

DETAILED DESCRIPTION OF THE INVENTION

Referring initially to FIGS. 1–19, in a component positioning method, a support sheet is used, with a Bernoulli effect labeler head, to accurately position a component on a workpiece. As a matter of convenience, the assembly method is generally discussed herein in terms of a preferred embodiment in which the workpiece is a one-time use camera. It will be understood that the method is applicable to other types of workpieces and is not limited to cameras of a particular type, nor to cameras in general.

Figure 1:
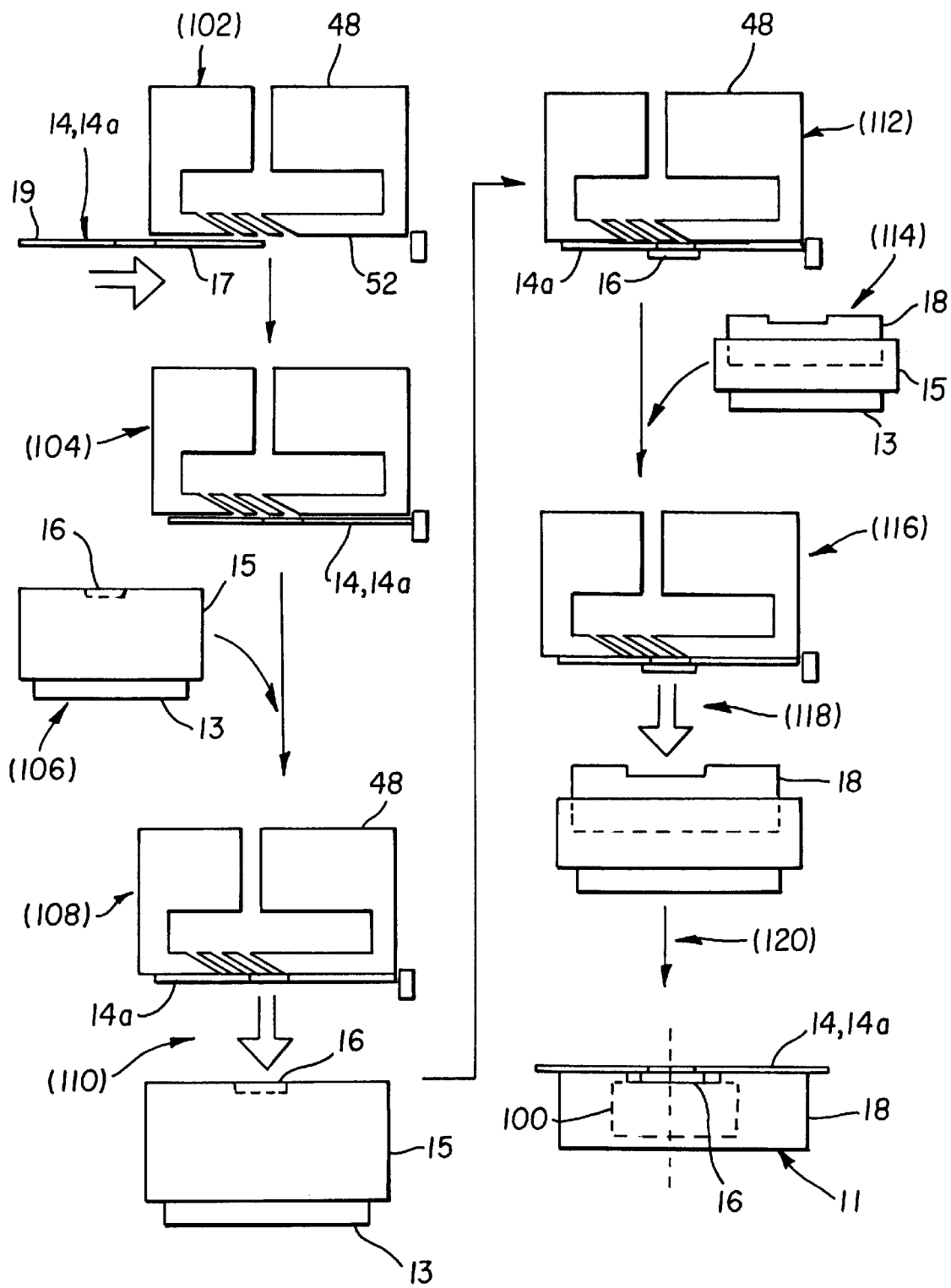
FIG. 1 is a diagrammatical view of an embodiment of a method for assembling a critically positioned camera component on a camera body.

The camera 11 has the component 16 installed in operative alignment with a camera subsystem 100 (indicated by a dashed line in FIG. 1. (Subsystems and aligned components are discussed in detail below.) The support sheet 14 can be retained on the camera body 18 as a label. The label can bear indicia and other printed matter on the front or rear side 17,19 of the component-bearing-label 128 or both; and can be transparent or have a transparent region (not illustrated). In some cases, all or part of the camera body 18 or component 16 may be transparent to allow visualization of the rear side 17 of a label.

The support sheet 14 can be a temporary carrier 14b for the component 16. In that case, the carrier 14b is removed after the component is attached to the body 18 (prior to use of the camera 11). Alternatively, after assembly, the component 16 can be held on the body 18 by all or part of the support sheet 14 or can be held by the body 18, or can be held by both. The component 16 and label 14 can together be what is referred to herein as an "component-bearing-label 128". In that case, the component 16 is inseparable from at least part of the support sheet 14. The component 16 can be made in one-piece with the support sheet 14 or can be separate until assembly.

The support sheet 14 is thin and, preferably, flexible. The support sheet 14 has a rear side 17 which is adhered to the body 18 or component 16 or both and a front side 19 that is opposite the rear side 17. For convenience, support sheets 14 are generally discussed herein in terms of labels 14a having printed matter only on the side of the component-bearing-label 128 that is not adhered to the camera body 18. It will be understood that like considerations apply to other types of support sheets 14.

Figure 2:
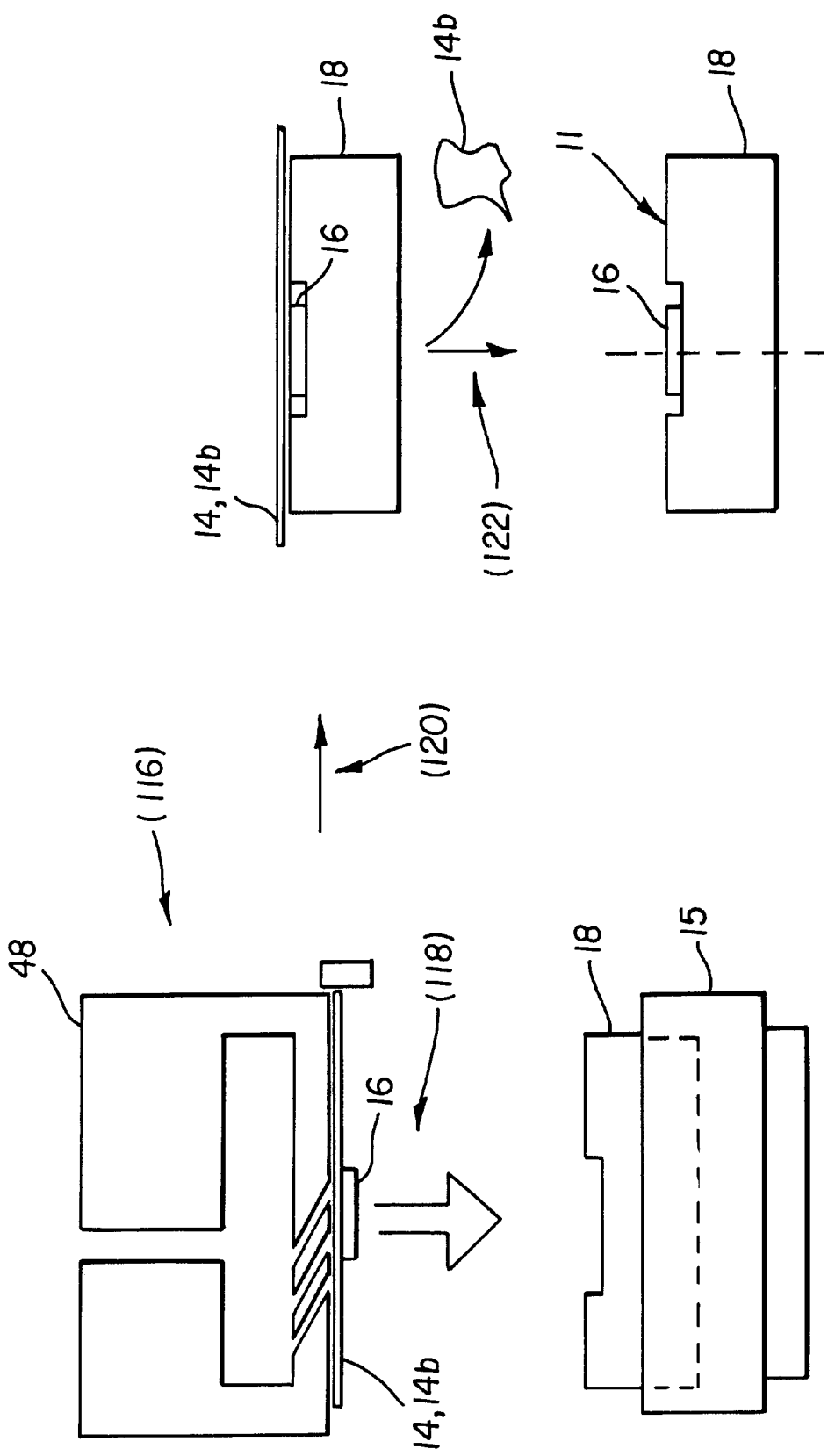
FIG. 2 is a diagrammatical view of the completion step of another embodiment of the method of FIG. 1.

Detailed features of components 16 and subsystems 100 can vary. Different electrical and optical components and related subsystems are described below. A single camera 11 can include multiple subsystems 100. The same support sheet 14 can be shared by more than one subsystem 100 or individual support sheets 14 can be used with individual subsystems 100. For convenience, the camera 11 is generally discussed herein in terms of one or more components 16 positioned by a single support sheet 14. The component 16 can be manufactured as a part of an component-bearing-label 128 or can be joined to an component-bearing-label 128 (or temporarily joined to a carrier) during camera assembly. FIGS. 1 is directed to an assembly method in which a separate component is joined to a label. FIG. 2 is directed to an assembly method using a carrier 14b. FIGS. 3–19 are directed to Bernoulli labelling equipment and methods generally.

Referring initially to FIG. 1, an component-bearing-label 128 is supplied (102) to a labeler head 48 and retained (104) in a predetermined position on the labeler head 48. (Suitable Bernoulli labeler heads, apparatus, and procedures are described in greater detail below.) The component 16 is then provided (106) in a predetermined location, in a nest or other support 15. The labeler head 48 is and retained component-bearing-label 128 is then positioned (108) relative to the nest 15 and component 16 and the component-bearing-label 128 is driven (110) against the component 16. The component 16 adheres to the component-bearing-label 128 (preferably on contact) and is thus, retained (112) on the component-bearing-label 128.

The component 16 is light weight and small relative to the component-bearing-label 128. The adherence of the component 16 to the component-bearing-label 128 can be provided by an adhesive coating on the back of the support sheet 14. Adherence between the support sheet 14 and the nest 15 is minimized or eliminated. This can be achieved in a number of ways. For example, the surface of the nest 15 in contact with the adhesive layer can be made of a material to which the adhesive does not stick. Alternatively, the adhesive can be pressure sensitive and the head and nest 15 can be shaped to limit contact between the support sheet 14 and nest 15. Another, simple alternative is that the adhesive coating can be present on the component 16, rather than the support sheet 14.

The camera body 18 is then provided (114) in a predetermined location, in a nest or other support 15. The component-bearing-label 128 and adhered component 16 are then precisely positioned (116) relative to the camera body 18. This can be achieved by moving the labeler head 48 and retained support sheet 14 and component 16, while holding the body 18 in a fixed position; but is more easily accomplished by replacing the component nest 15 with the workpiece nest 15. Using a conveyor 13, component nests and workpiece nests can be alternated in sequence and can be advanced under the labeler head 48 as needed.

The labeler head 48 is next driven toward the body 18 and the component-bearing-label 128 and component 16 are pressed (118) against the camera body 18. The pressing of the component-bearing-label 128 and component 16 against the body can be provided by the movement of the labeler head 48. Alternatively, a pulse of higher pressure air can be used to urge the support sheet and adhered component against the body 18. The adhered component 16 moves with the support sheet 14 and is pressed into position at the same time.

In a particular embodiment, the body or the nest 15 has an opening or other pilot feature 92 about which support sheet 14 is to be accurately positioned. In that case, the labeler head 48 is moved toward body 18, or vice versa, to permit a locator pin 72, which preferably is tapered as illustrated, to enter opening 92. The taper on locator pin 72 can be used to finely position body 18 in alignment with the labeler head 48. Then, as the labeler head 48 is moved into close proximity with the body, locator pin 72 engages opening 92 and retracts against the force of spring 82; so that, support sheet 14 is accurately applied about opening 92.

After the support sheet 14 is pressed against the workpiece, the labeler head 48 is withdrawn (120) relative to the body 118. In the embodiment shown in FIG. 1, the component-bearing-label 128 remains adhered to the body 18 and the component 16 remains in place on the body 18. Further assembly procedures, testing, and the like can continue from this point. Referring now to FIG. 2, steps (116) and subsequent are illustrated for the method in which the support sheet 14 is a carrier 14b. The same procedure is followed and the same considerations apply as in FIG. 1 with the exception that, after the labeler head 48 is withdrawn (120), the carrier 14b is removed (122) from the body 18 and component 16. The carrier 14b can be reused or discarded. The component 16 adheres to both the carrier 14b and the body 18. The adherence to the body 18 is greater. This can be achieved in a variety of ways. For example, the component can be solvent welded or sonic welded or mechanically fastened to the body after positioning using a carrier having a layer of peelable pressure sensitive adhesive. The strength of the bond provided by the adhesive is less than the strength of the bonding provided by the other methods. High strength adhesives, such as curable epoxy adhesives can also be used in place of the welding and mechanical fastening.

Bernoulli effect labeler heads 48 and labeling equipment suitable for the methods above-disclosed relating to carriers 14b and labels 14a, are disclosed in U.S. Pat. No. 5,472,543. (The term "support sheet 14" is used generically to refer to the carrier and various labels disclosed herein.) The labeler head 48 comprises a main member 50 having a support surface 52 which may be flat, or convex and substantially cylindrical with an axis of curvature. A plenum 54 within the main member 50 communicates with a plurality of bores 56 extending from the plenum 54 through the support surface 52. The bores 56 are angled with respect to the support surface 52 and are arranged in an array so that jets of gas issuing from the array will cause a support sheet 14 to be drawn onto the support surface 52 when the support sheet 14 is presented to the support surface 52 and a first side of the support sheet 14 is brought into close proximity of the jets, thereby causing a zone of reduced gas pressure to be formed between the support surface and the first side of the support sheet 14 and establishing a pressure differential across the support sheet 14 to hold the support sheet 14 on a film of gas flowing over the support surface. A gas supply (not shown) provides a flow of gas into the plenum and through the angled bores 56. The gas supply provides pulses of higher pressure gas to propel support sheets 14 against the camera body 18 to be labeled and can provide a vacuum to the labeler head 48 as necessary to hold support sheet 14.

In the apparatus, an elongated carrier strip 12 has a surface having low affinity for the adhesive-backed side of a plurality of pressure-sensitive support sheets 14. Display sides of the support sheets 14 face outward from the carrier strip 12. Support sheets 14 can be of practically any shape and are moderately stiff, to facilitate ready removal from the carrier strip 12. The carrier strip is wound in a large roll 24 prior to support sheet removal. The used carrier strip 12, depleted of support sheets 120, is likewise wound in a roll 26. The rolls 24,26 are mounted to the apparatus 10 for rotation such that strip 12 is pulled around an idler roller 20 and then around the edge of a peeler plate 22. Because the adhesive backing on support sheets 14 has a low affinity for the surface of strip 12 and because support sheets 14 have a certain resistance to bending, the support sheets 14 will release gradually and automatically from strip 12 as the strip passes around the edge of the peeler plate 22 and are presented essentially tangentially to the labeler head 48. The labeler head 48 is reciprocated in directions indicated by double-headed arrow 28 by a drive 29. The component 16 and body 18 are each supplied in a supportive nest 15 that rests on a bracing or conveyor (not separately designated).

The main member 50 of the labeler head 48 is a material such as metal or rigid plastic or a resilient material. The support surface 52 is smooth and typically flat. Within main member 50, a plenum 54 communicates with a plurality of bores 56 which extend from plenum 50 to support surface 52. In a particular embodiment of the invention, bores 56 have a diameter in the range of 0.012 to 0.032 inch (0.030 to 0.081 cm) and are set at an angle to support surface 52 in the range of 5 to 45 degrees. A port 58 is provided through main member 50 to connect plenum 54 to the gas supply to provide pressurized air or subatmospheric pressure. Bores 56 are arranged in an array so that jets of gas issuing from the bores will cause support sheet 14 to be drawn onto support surface 52 when the support sheet 14 is presented to the support surface and its display side is brought into close proximity with the jets of gas. The flow of gas causes a zone of reduced gas pressure to be formed between support surface 52 and support sheet 14, in accordance with the Bernoulli Effect, thereby establishing a pressure differential across the support sheet 14 to hold the support sheet 14 in position on a film of gas flowing over the support surface. The array is also configured so that, once released, support sheet 14 will move relative to support surface 52 and reposition itself accurately against one or more stops 60 provided on or adjacent the support surface. Just as shown in FIGS. 4 and 11–19, with the labeler head of FIGS. 4–7, support sheet 14 covers the portion of the array of bores 56 which are at least partially directed toward stops 60, when the support sheet 14 is positioned against the stops. Thus, the rear or upstream edge of the support sheet 14 is not subjected to air flows which could dislodge it from its position against the stops. Stops 60 can be supported on resilient springs 61, which allow the stops to be depressed to the level of support surface 52 during support sheet 14 application. Preferably, stops 60 are made from a material to which the adhesive of the support sheets 14 will not stick readily, such as Rulon, a plastic material made by Dixon Industries Corp. of Bristol, R.I. U.S.A.

Figure 7:
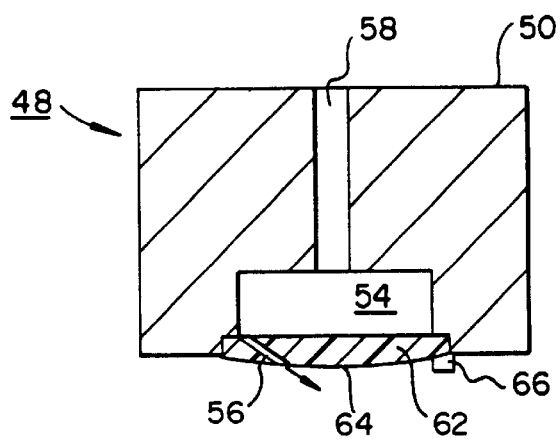
FIG. 7 shows an elevation section view through the labeler head of FIG. 8.

FIGS. 6–7 illustrate another labeler head 48 also useful with the apparatus 10, in which flat support surface 52 is replaced by a resilient insert 62 of a material such as silicon rubber which has cylindrical, convex support surface 64 having an axis of curvature transverse to the direction from which support sheet 14 is fed to labeler head 48. A pair of stop pins or abutments 66 are provided on one side of support surface 64. Stop pins 66 preferably also are made from a non-stick material such as Rulon. In a particular embodiment, at least a portion of bores 56 are angled so that their jets of gas are directed at least partially toward stop pins 66 and do not oppose movement of support sheet 14 onto the labeler head 48. By "at least partially toward" is meant that none of the air jets includes a vector component which would oppose movement of the support sheet 14 across support surface 64. For round support sheets 14, the jets from bores 56 can be symmetrically placed on either side of the path of the support sheet 14 onto the labeler head 48. Round support sheets 14 upon release will move across support surface 64 into accurate engagement with stop pins 66. The support sheet 14 may be provided with a radially inwardly or outwardly extending feature which is engaged by the means for stopping. The support sheet 14 may have a central aperture; and the main member 50 may have a locator pin positioned centrally of the array, the pin being sized to pass through the aperture of the support sheet 14 and preferably being retractable. Non-symmetric arrays of bores are also useful, for example, with rectangular support sheets 14. The resilient material of insert 62 and the cylindrical shape of support surface 64 ensure that when the labeler head 48 is pressed against an workpiece to apply support sheet 14, essentially line contact is first established due to the cylindrical shape and then the insert compresses, so that the support sheet 14 is smoothly applied without bubbles or wrinkles.

Figure 8:
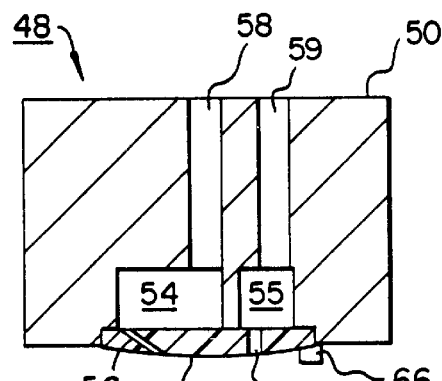
FIG. 8 shows an elevation view of a third embodiment of the labeler head.

FIG. 8 shows a modification of the labeler head of FIGS. 6–7. Within main member 50, a second plenum 55 communicates with one or more bores 57 which extend from plenum 55 to support surface 64. Such a second plenum and bores also may be included in the other labeler heads 48 discussed. A port 59 is provided from plenum 55 to a source of pressurized air; so that, a blast of air through bores 57 may be used to blow the support sheet 14 onto the workpiece to be labeled.

Figure 9:
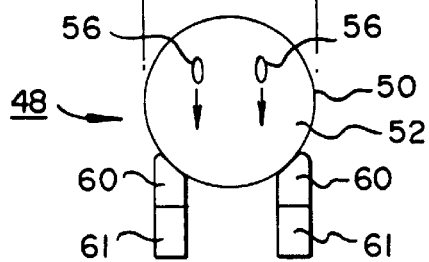
FIGS. 9–10 show a plan views of alternative versions of the labeler heads of FIGS. 4–6.
Figure 10:
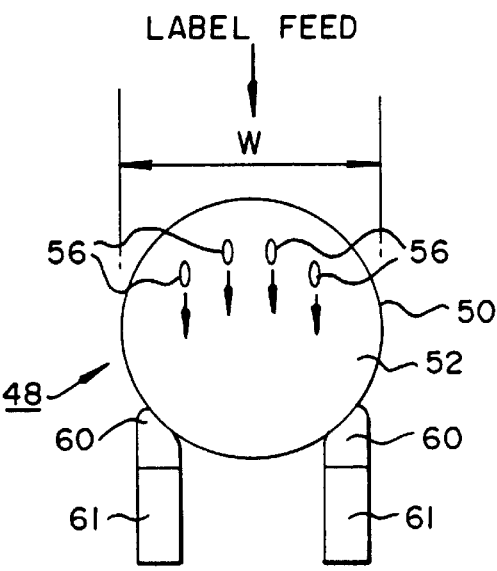
Figure 13:
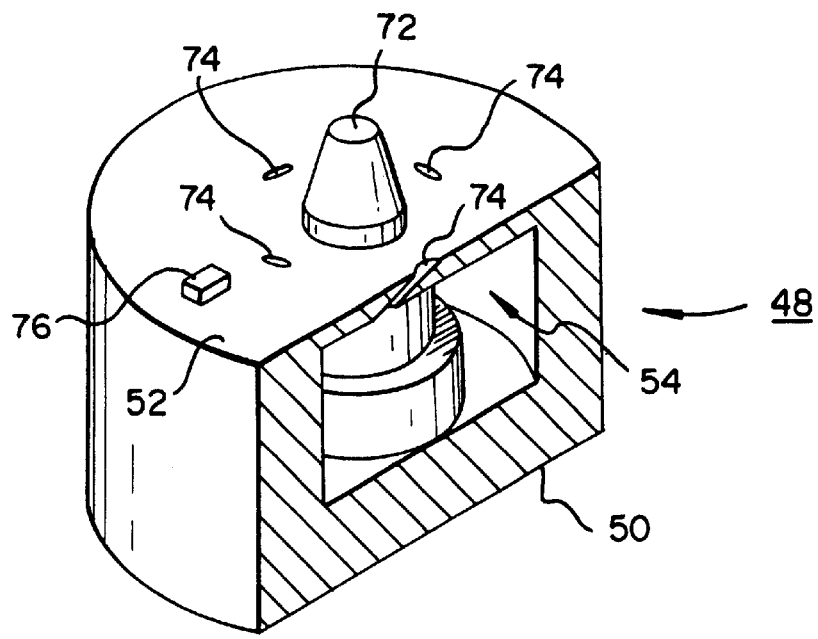

FIGS. 9–10 illustrate typical arrays of bores 56 for labeler heads 48 of FIGS. 4–8, having flat support surfaces 52 approximately 0.6 and 1.0 inch (1.52 and 2.54 cm), respectively, in width ("W" in FIGS. 12–13). The number of bores depends upon the area and weight of the support sheet 14. The arrows indicate the direction of the jets from bores 56 toward stops 60, preferably so that no vector component of any jet will oppose movement of support sheet 14 onto support surface 52. For round support sheets 14, the jets preferably are symmetrically placed relative to the path of the support sheet 14. Thus, round support sheets 14 upon release will move across support surface 52 into accurate engagement with stops 60. Similar arrays of bores may be used for support sheets 14 of other shapes.

Figure 14:
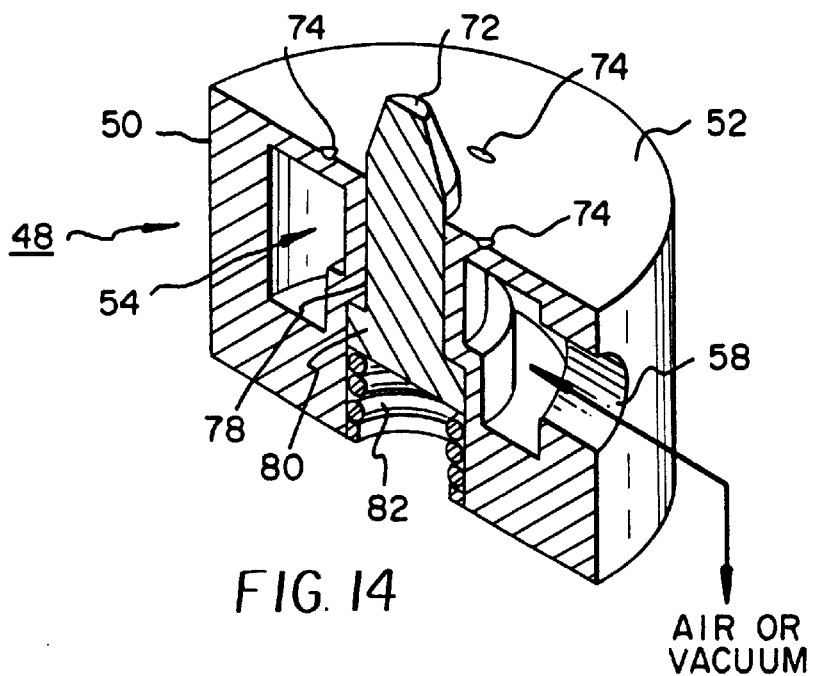

FIGS. 11–14 illustrate another labeler head 48 which is suited for applying support sheets 14 having a central aperture 68 and a radially inwardly extending feature such as a notch 70 extending over an arc of the circumference of the support sheet 14. In this case, main member 50 is provided with a centrally positioned, tapered locator pin 72 which extends from support surface 52. The diameter of locator pin 72 preferably is only slightly smaller than that of central aperture 68, to accurately center the support sheet 14 on the labeler head 48. Surrounding locator pin 72 is an array of angled bores 74 whose jets extend in generally the same sense or circular direction about locator pin 72. When support sheet 14 is released so that locator pin 72 enters aperture 68, the support sheet 14 will move down onto and spin around locator pin 72 until notch 70 settles over an axially extending stop or abutment 76, thereby stopping movement of the support sheet 14 and accurately centering and angularly positioning it for application. As shown in FIG. 11, support sheet 14 covers the portion of the array of bores 74 which are at least partially directed toward stop 76, when the support sheet 14 is positioned against the stop. Thus, the circumferential edge of the support sheet 14 is not subjected to air flows which could dislodge it from its position against the stop. Preferably abutment 76 is retractable during application of the support sheet 14, (not illustrated). As shown in FIGS. 13–14, main member 50 comprises a central stepped bore 72 surrounded by plenum 54, in which locator pin 72 is slidably mounted. A head 80 on the locator pin is pressed against by a spring 82; so that, locator pin 72 is retractable but is biased to extend beyond support surface 52 as illustrated. As will be discussed further with respect to FIG. 18, the retractability of locator pin 72 facilitates use of labeler head 48 to accurately place support sheet 14 around an opening in the camera body 18 to be labeled. Subatmospheric pressure can be applied to plenum 54 after the support sheet 14 has been acquired and repositioned.

Figure 15:
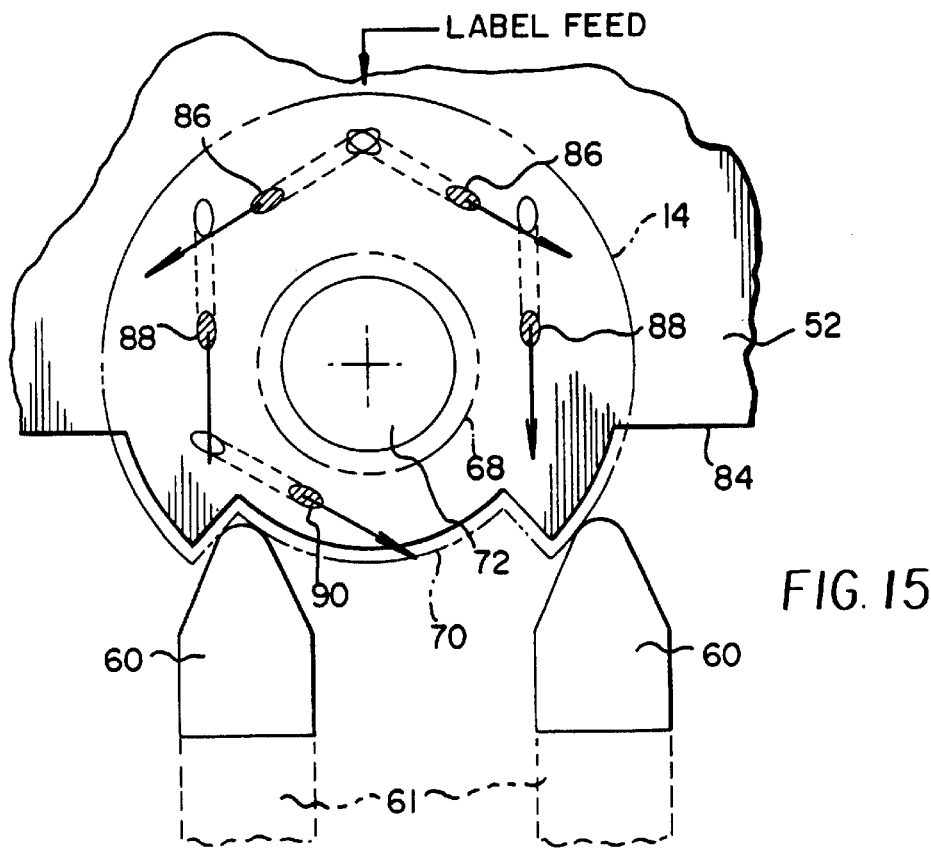
FIGS. 15 and 16–19 are plan and perspective views, respectively, some in section, of a fifth embodiment of the labeler head.
Figure 16:
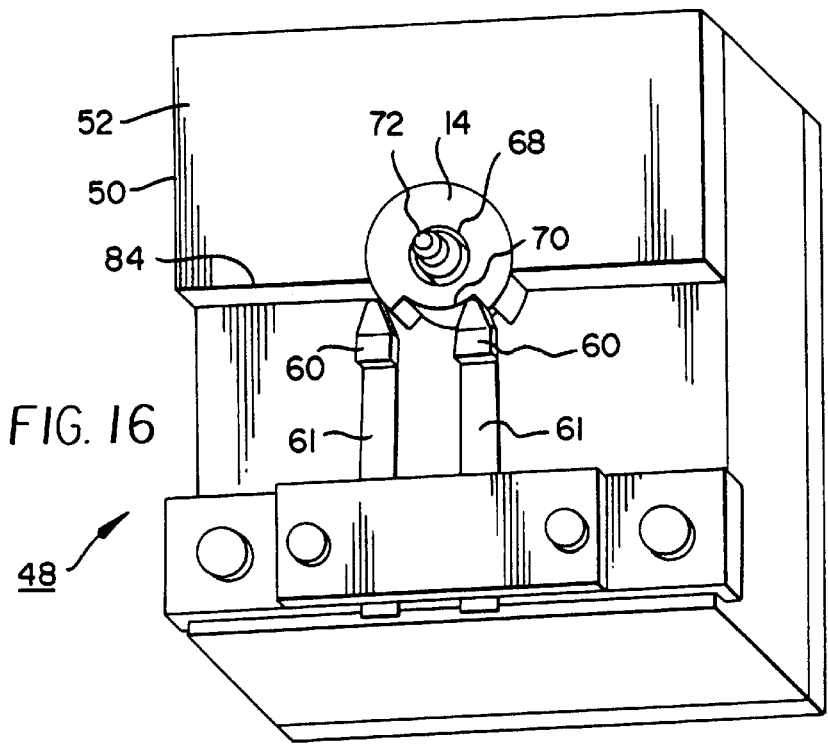
Figure 17:
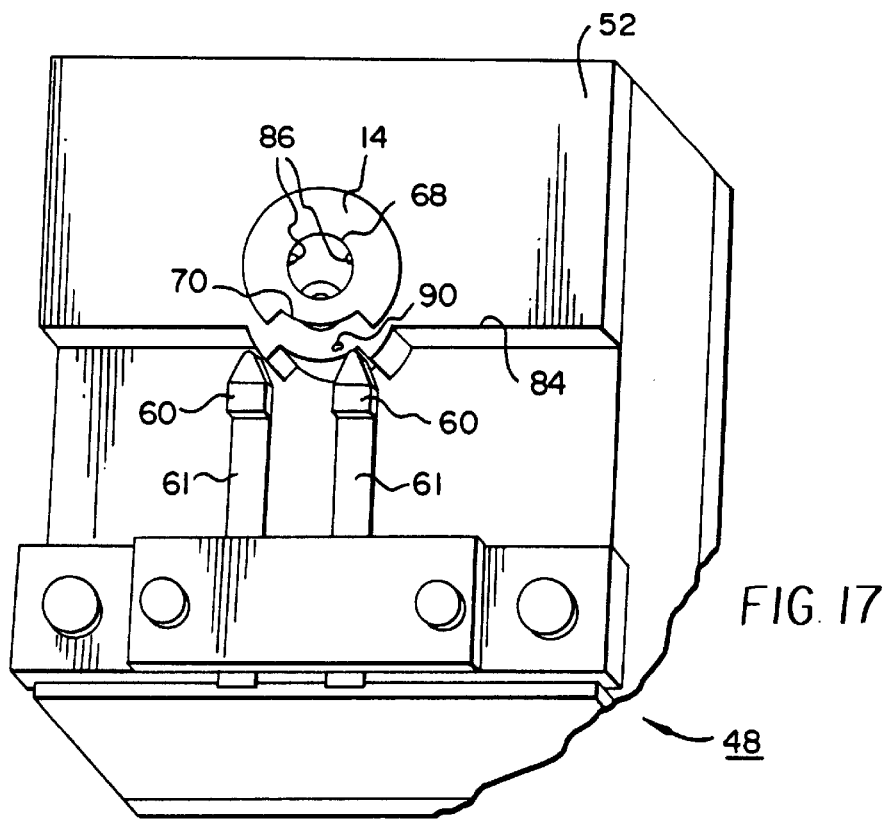
Figure 18:
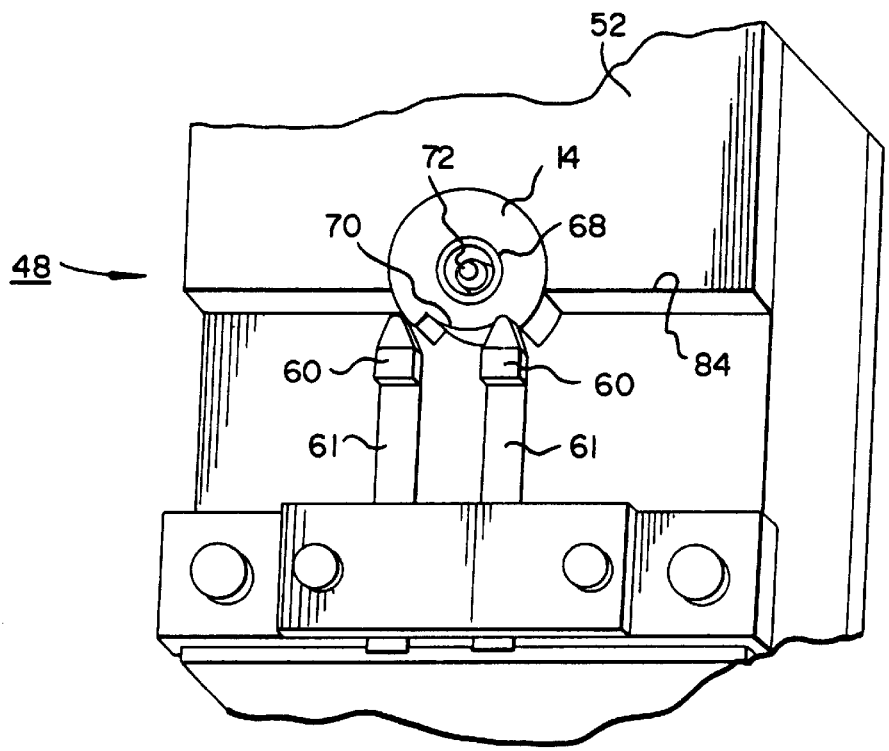
Figure 19:
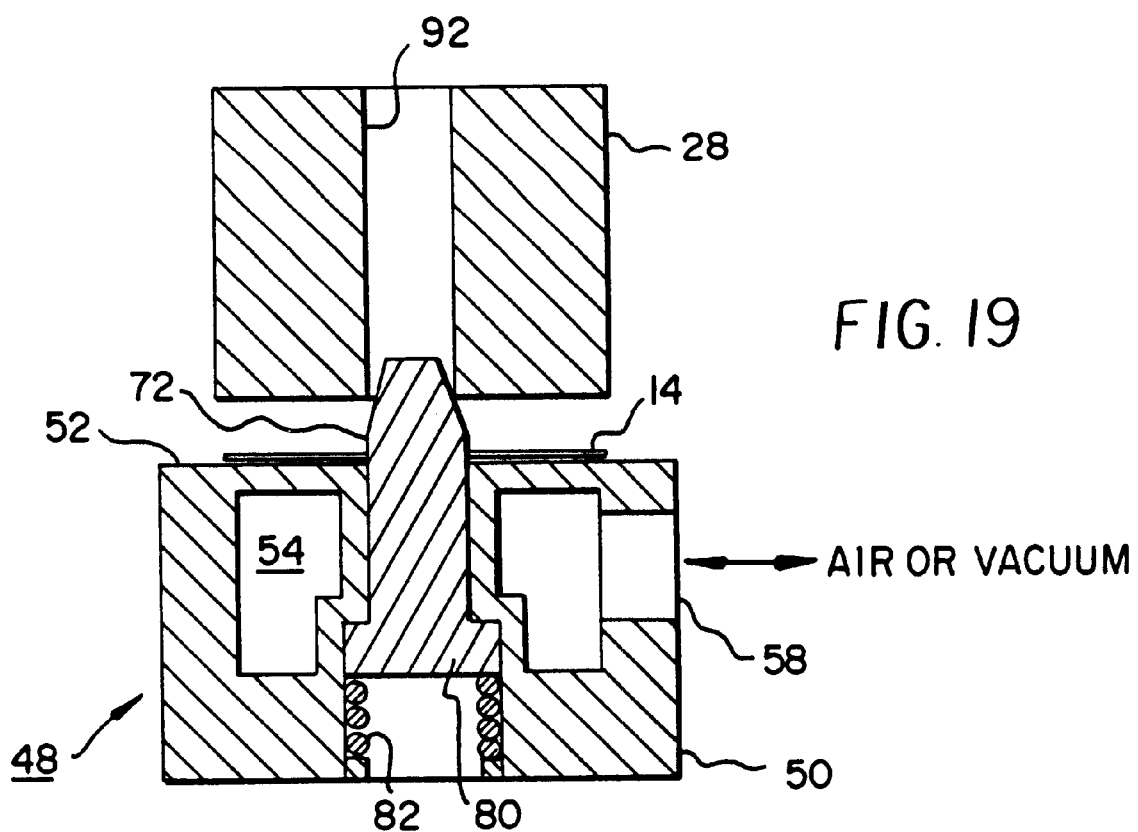

FIGS. 15–19 illustrate another labeler head 48 which also is suited for applying support sheets 14 having a central aperture 68 and a peripheral notch 70. In this instance, locator pin 72 can be withdrawn below support surface 52 by any convenient means such as a solenoid or air cylinder (not illustrated), to permit support sheet 14 to be presented and accurately positioned in a different manner. Thus, the diameter of locator pin 72 can be substantially less than that of aperture 68. To facilitate adjustment of the lateral positions of stops 60 and to allow the stops to be depressed to the level of support surface 52, support surface 52 preferably ends at a recess having an edge 84 which along a portion of its length is shaped geometrically similarly to the portion of support sheet 14 comprising notch 70. Opposite this portion of edge 84 and extended over the recess are stops 60, laterally positioned so that the first stop can engage one side of notch 70 and the second stop can engage the periphery of support sheet 14 on the opposite side of notch 70 from the first stop, as seen most clearly in FIGS. 18 and 21. The support sheet 14 is presented to support surface 52 along a path directly toward stops 60. Rather than the circular array of jets of the embodiment of FIGS. 11–14, a first pair of bores 86 are provided on the opposite side of locator pin 72 from stops 60 and are directed at angles toward opposite sides of locator pin 72; a second pair of bores 88 are directed directly toward stops 60 on opposite sides of locator pin 72; and a single, angular orientation bore 90 nearest stops 60 is directed at an angle toward the more distant of stops 60. Bore 90 may be positioned on either side of the path of support sheet 14. In a particular embodiment, none of the jets includes a vector force component which would oppose movement of the support sheet 14 across support surface 52. Support surface 52 preferably is flat but also may have a cylindrical, convex shape of the type shown in FIGS. 6–7. With this arrangement, once locator pin 72 has been withdrawn, a support sheet 14 presented in the direction shown will be moved by jets 86, 88 across support surface 52 toward stops 60 and will be turned by jet 90; so that, stops 60 accurately engage notch 70 and the periphery of the support sheet 14. Locator pin 72 can then be extended through central aperture 68. As shown in FIGS. 15 and 18, in the embodiment of FIGS. 15–19 support sheet 14 covers the portion of the array of bores 86, 88, 90 which are at least partially directed toward stops 60, when the support sheet 14 is positioned against the stops. Thus, the circumferential edge of the support sheet 14 is not subjected to air flows which could dislodge it from its position against the stops. Support sheets 14 of different shapes may be acquired and repositioned using somewhat different arrays of jets and stops.

Many different types of components 16 can be joined to the body 18 of the camera 11 using the component positioning method. Support sheets 14 and components 16 can be critically positioned; that is, attached at precise locations with tolerances of ±0.3 mm. Tolerances of 0.2 mm or less and 0.1 mm or less can be provided by careful tolerancing of all manufacturing components or by culling of cameras with the greatest variance, or both.

Critical positioning can be a requirement of an individual component 16 or can be required to accurately position a plurality of different, spaced-apart components 16. Detailed features of the components 16 can vary and a single camera 11 can include a plurality of different types of components 16. The same support sheet 14 can be shared by more than one component 16 or individual support sheets 14 can be used with individual components 16. For convenience, cameras 11 having critically positioned components are described below in terms of a camera 11 having multiple subsystems 100 of the invention and a single support sheet 14. It will be understood that like considerations apply to other embodiments.

Camera Having Component-bearing-label with Optical Component

Referring now particularly to FIGS. 20–29, a camera 11 has a body 18 having boundary parts 123 that define one or more passages 124 and comprise one or more optical subsystems 100*a*. An component-bearing-label 128 has an attachment portion 126 that is adhered to the body 18 and one or more optical components 125. Each optical component 125 can be a single optical element or an assemblage of multiple optical elements. For convenience, the camera 11 is generally discussed here as if an component-bearing-label 128 was limited to a single optical component 125. It will be understood that, as the figures illustrate, an component-bearing-label 128 is not limited to a single optical component. It will also be understood that like considerations apply to cameras 11 having more than one component-bearing-label and different combinations of component-bearing-labels, optical elements and components.

In addition to the optical component or components 125 and the attachment portion 126, the component-bearing-label 128 can optionally also include an ancillary portion (not shown) that is unattached to the body 18 or component 16; but this is generally not preferred since such an ancillary portion is less supported and has a greater risk of being torn or otherwise damaged during use.

The optical component 125 is of one-piece with the attachment portion 126 of the component-bearing-label 128 and is inseparable from the attachment portion 126 without damage to the component. The optical component can be unitary; that is, made as one-piece with and continuous with the remainder of the component-bearing-label 128, differing only in optical characteristics. The optical component can also be a discrete item, adhered to the attachment portion 126. In the latter case, the attachment portion 126 can be part or all of an component-bearing-label 128, as above discussed.

The optical component 125 is located on the camera 11 so as to function with a respective optical subsystem 100*a*. In addition to boundary parts 123, an optical subsystem 100*a* can also include other parts, such as additional optical components that are not part of the component-bearing-label 128. Each optical component 125 is located at an outer end 130 of a respective passage 124 in optical alignment with the optical subsystem 100*a*. For example, in FIGS. 27–28, the optical components 125 have optical axes that are coextensive with a centerline of passage 124.

A single component-bearing-label 128 can provide multiple optical components 125 and can provide both unitary and discrete optical components 125. Individual, spaced apart attachment portions 126 can be provided for individual optical components 125, but it is preferred that the attachment portion 126 is continuous. The attachment portion 126 is preferably compliant unless use is limited to a flat surface of the body 18.

The optical component 125 can be centerless or can be centered on an optical axis 132. Centerless optical components 125 include transparent plates and filters having no power. Centered optical components 125 have a power or fiducials or other features that define an optical axis 132 and require alignment of the optical axis 132 and the passage 124. The optical axis 132 is generally centered in the passage 124, but may be located off center in a predetermined manner. In either case, misalignment would compromise camera function. Centered components must be precisely and accurately positioned on the camera body 18. Centerless components can be oversize and thus not need precise and accurate positioning. Alternatively, centerless components may require precise and accurate positioning as a result of mechanical constraints due to the shapes of the optical component and the end of the respective passage 124.

Referring now particularly to FIGS. 20–21 and 24–25, the body 18 of the camera 11 has a film counter 134 that is located interior to the outside surface 135 of the camera 11. The film counter 134 is driven by a film transport (not shown). A passage 124, defined by the body 18, has an outer end 130 at the outside surface 135 of the body 18 and an inner end 136 aligned with and closely adjoining the film counter 134. The component-bearing-label 128 includes a counter window 125*a* that makes visible indicia on the counter indicating film usage. The counter window 125a can be a transparent area lacking optical power, but is preferably a magnifier. A fresnel lens 125a that acts as a magnifier is preferred. To keep the outside 135 of the camera 11 smooth, the fresnel lens extends inward into the outer end 130 of the passage 124 toward the counter 134 from an outer surface 192 of the component-bearing-label 128.

Figure 26:
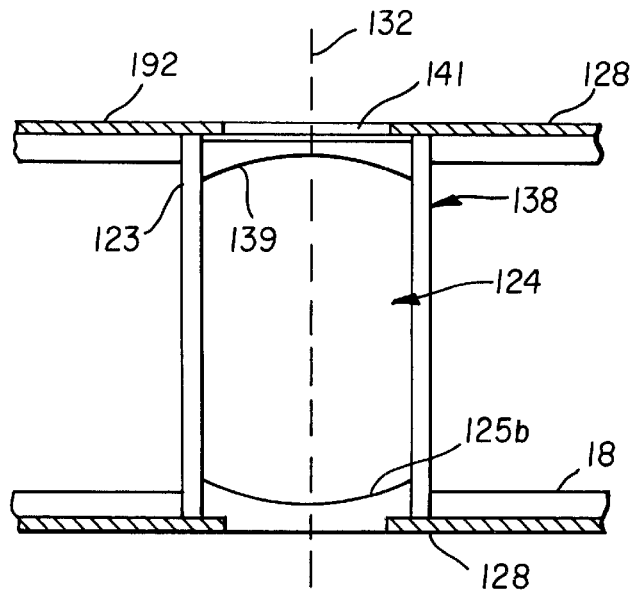
FIG. 26 is a partial cross-sectional view of the camera of FIG. 20. For clarity, only the viewfinder frame and rear viewfinder lens of the frame assembly are shown. In this and the other figures, some dimensions of some items, such as the label, are exaggerated for clarity.
Figure 27:
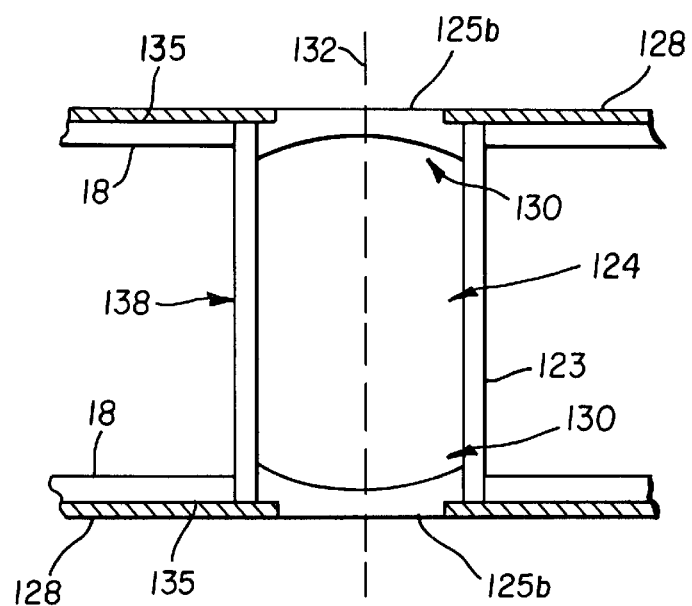
FIG. 27 is the same view as FIG. 26, but the camera is modified to include both front and rear viewfinder lens as parts of the label.

Referring now particularly to FIGS. 20–23 and 26–27, the body 18 of the camera 11 has a viewfinder housing 138 that defines a passage 124 having two opposed ends 130,136 adjoining the outside surface 135 of the body 18. In FIG. 27, the component-bearing-label 128 includes a pair of optical components 125 in the form of viewfinder lenses 125b, which are disposed in the ends 130,136 of passage 124. One of the lenses 125b has a fiducial pattern 140 indicating a picture center (dashed circle) and margins (chevrons). The optical axis 132 of the optical components 125b is coextensive with a longitudinal axis of the passage 124. In FIG. 26, the component-bearing-label 128 includes only one of the viewfinder lenses 125b. The other lens 139 of the viewfinder is not part of the component-bearing-label 128, but rather part of the viewfinder subsystem 100a. In place of the second viewfinder lens 125b, the component-bearing-label 128 has a centerless optical component such as a transparent window or filter 141.

Figure 20:
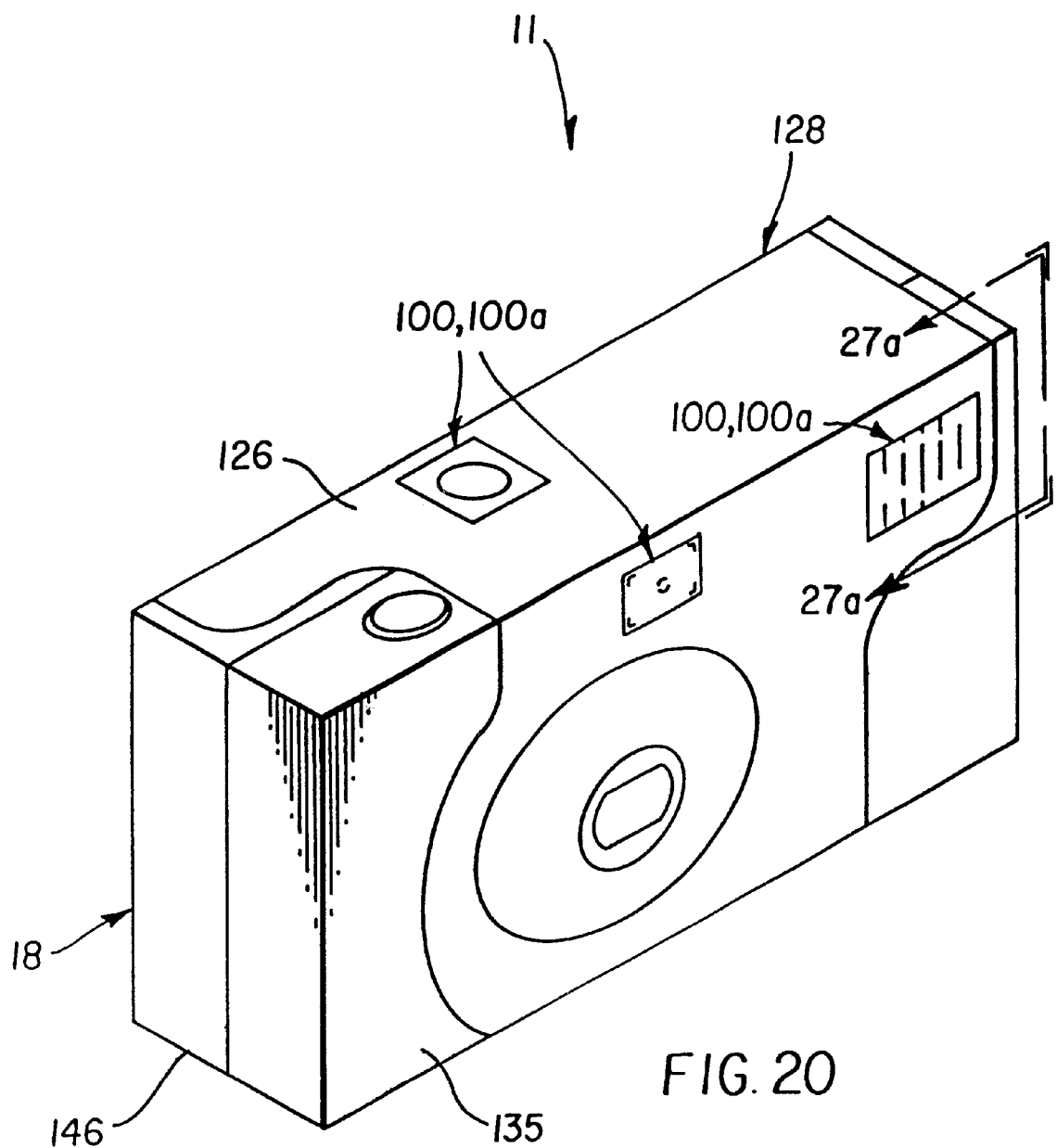
FIG. 20 is a perspective view of an embodiment of the camera including two openable cover parts and three breakable optical components. The openable cover parts are shown in the closed position.
Figure 21:
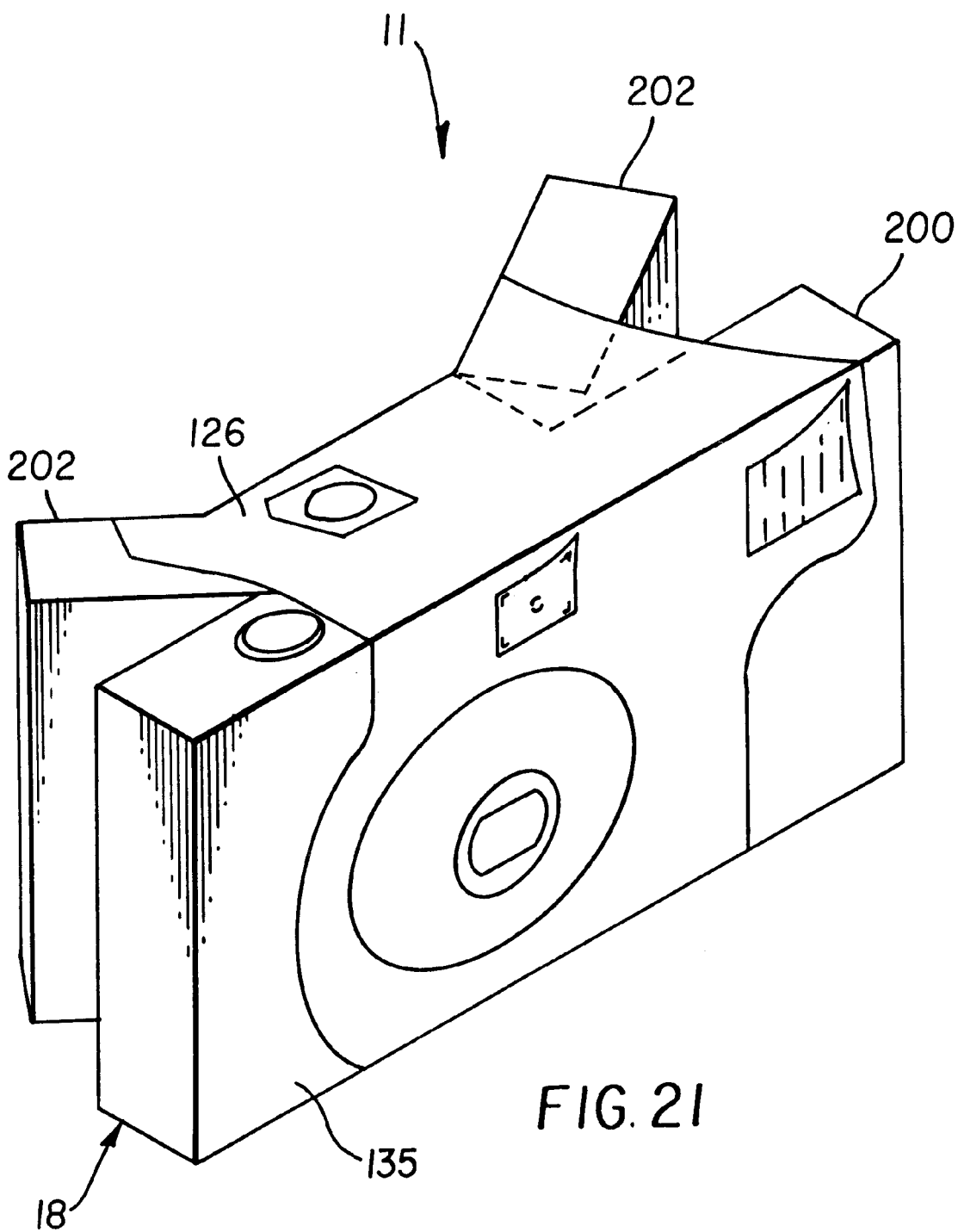
FIG. 21 is the same view as FIG. 20, but the two openable cover parts are in the unclosed position.
Figure 22:
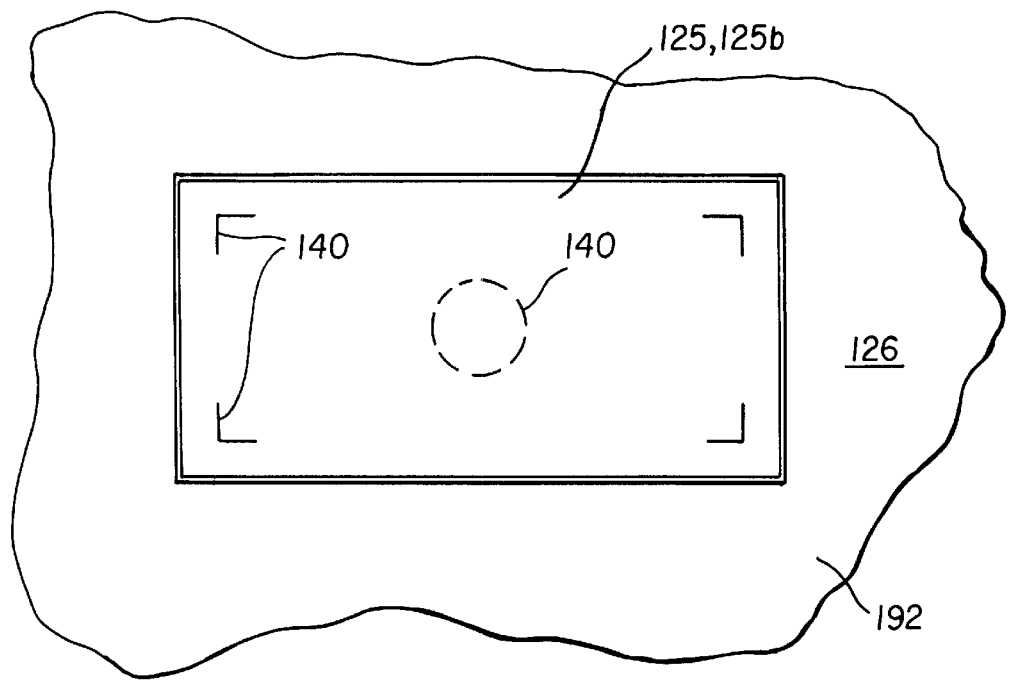
FIG. 22 is a partial front plan view of the camera of FIG. 20 showing the front viewfinder lens and a section of the attachment portion of the label. The viewfinder lens is in an unbroken configuration.
Figure 27A:
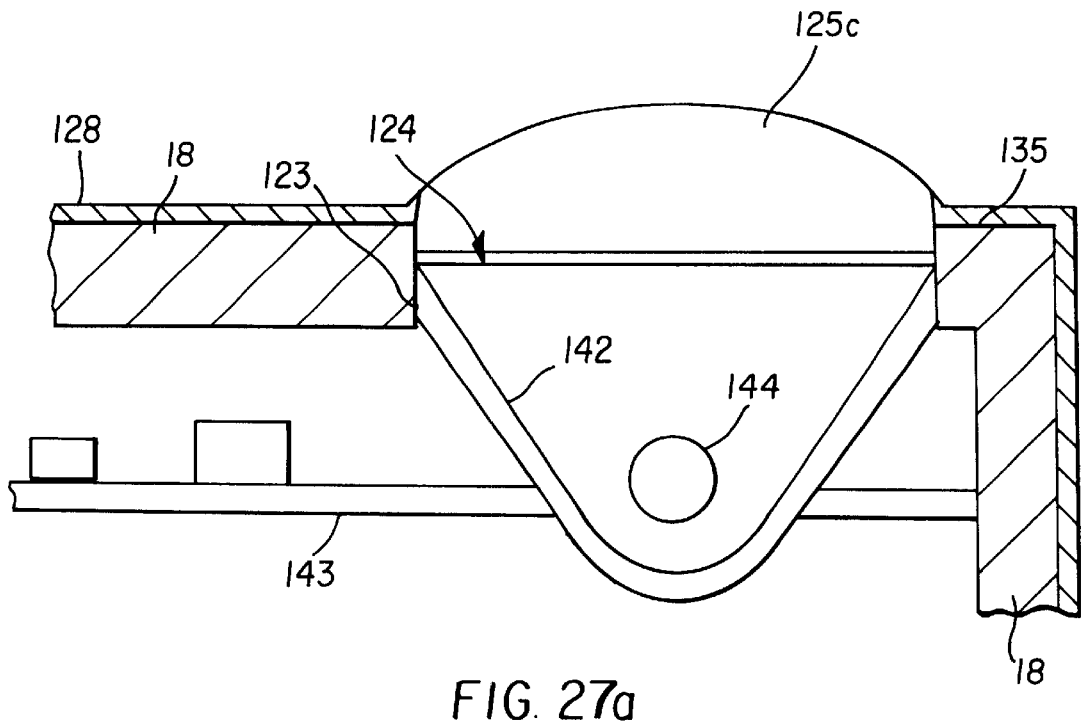
FIG. 27a is a partial cross-sectional view of the camera of FIG. 20 taken substantially along line 27a—27a of FIG. 20.

Referring now particularly to FIGS. 20–21 and 27a, the body 18 has a flash unit 141 that includes a flash reflector 142 and a circuit board 143 located interior to outside surface 135. A passage 124, defined by the body 18 has an outer end 130 at the outside surface 135 and an inner end 136 that is aligned with and closely adjoins the flash reflector 142. The optical component 125 is a flash lens 125c. The flash lens 125c is aligned with a cylindrical flash tube 144 mounted in the reflector 142.

Figure 28:
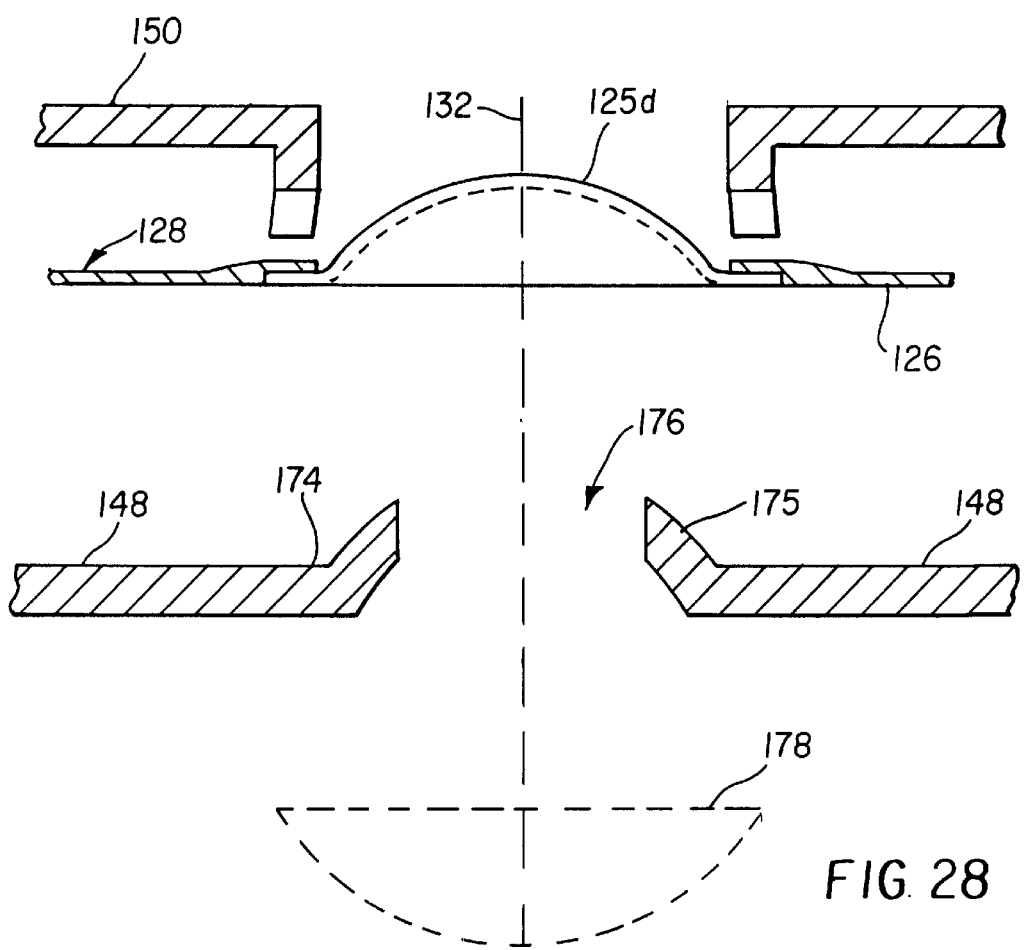
FIG. 28 is an exploded partial cross-sectional view of another embodiment of the camera showing a lens mount and part of a label including a breakable lens element. The position of an additional lens element is indicated by a dashed line.
Figure 28A:
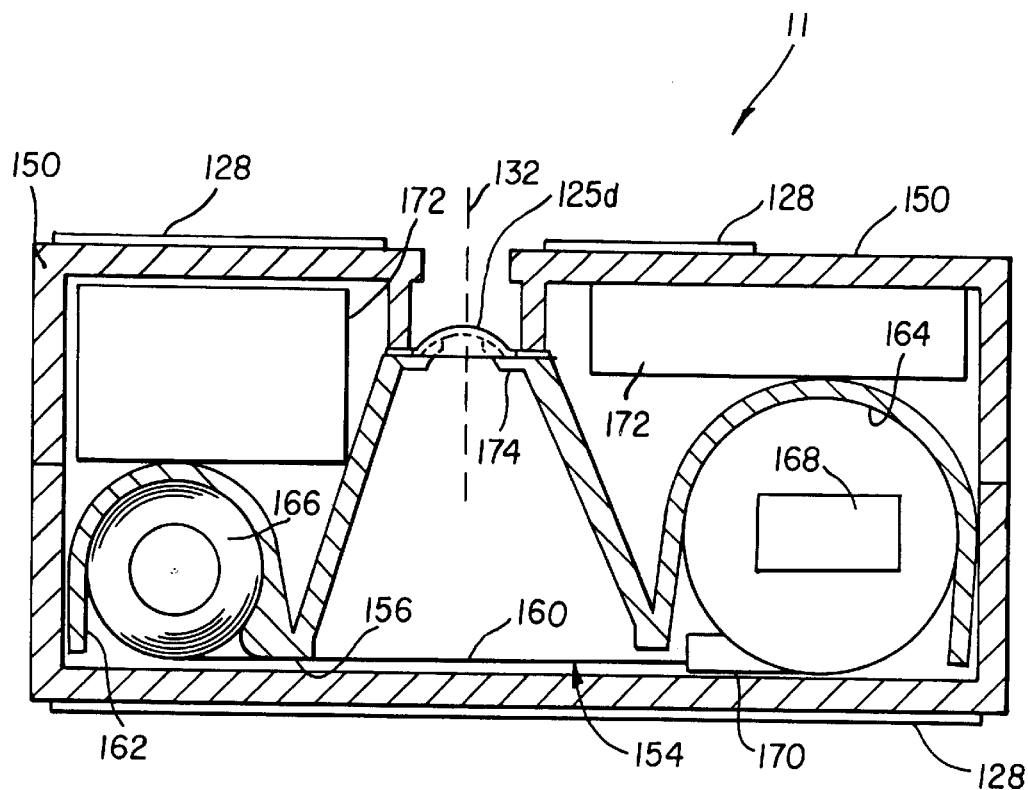
FIG. 28a is a semi-diagrammatical cross-sectional view of the camera of FIG. 28.

Referring now particularly to FIGS. 28–28a, a camera 11 has a casing 146 that includes a frame 148 and front and rear covers 150,152 joined over the frame 148. The casing 146 encloses a film area 154 that includes an exposure chamber 156 to which light is directed by the taking lens 125d for picture taking. Within the casing 146, in the film area 154, unexposed film 160 is moved from a first film chamber 162, across the exposure chamber 156, to a second film chamber 164. The type of film 160 and manner of film transport is not critical. For example, a one or two chamber film cartridge or a cartridgeless film roll can be used. Film can be prewind and be returned to a film cartridge at the time of film exposure, or rewinding after exposure can be required. The embodiment illustrated is a one-time use camera 11, in which a film roll 166 housed in an otherwise empty film supply chamber 162, is moved by a film transport (indicated schematically by box 168) across the exposure chamber 156 to a film cartridge 170 housed in a film cartridge chamber 164. The exposure chamber 156 is between the opposed film chambers 162,164 and has an exposure chamber 156 through which light is admitted from the taking lens 158 when film exposures are made. The chambers 156,162,164 are parts of the frame 148. Joined to the frame 148 are various camera components 172 (illustrated by boxes in FIG. 27b) that, together with the frame 148, comprise a frame assembly 149. Examples of such components include a viewfinder, a flash unit, an shutter mechanism, and the film transport 168. The components 172 include appropriate control features that extend through the casing 146. The shutter mechanism includes a shutter button. The film transport 144 includes a thumbwheel or advance lever. Suitable components and other features of the camera 11 that are not illustrated, are well known to those of skill in the art. Camera features described in this paragraph can be present in the other cameras disclosed elsewhere herein.

The frame 148 includes a lens mount 174. The lens mount 174, shown is a continuous part of the frame 148 and includes an aperture stop 175 that surrounds an aperture opening 176. The lens mount 174, as a whole, or just the aperture stop 175 can also be provided as separate parts that are assembled with the rest of the frame 148. The camera 11 has an internal component-bearing-label 128 a adhered to the lens mount 174. The component-bearing-label 128 a faces, but is interior to the front cover 150. A second, external component-bearing-label 128, like those discussed elsewhere herein, can also be present. The component-bearing-label 128 includes an optical component 125 in the form of a taking lens element 125d. The component-bearing-label 128 is attached to the frame 148, such that the taking lens element 125d, aperture opening 176, and any other related parts, such as an optional second lens element 178 all define a single optical axis 132, within the tolerances of Bernoulli labelling methods and apparatus like those above disclosed. An alternative embodiment shown in FIGS. 29–29a has similar features, but the adjunct label 128 including the taking lens element 125d is external to a front cover 150. The lens mount 174 is part of the front cover rather than the frame.

Camera Having Component-bearing-label with Electrical Component

Referring now particularly to FIGS. 30–37 and 42–43, a camera 11 has an electrical subsystem 100b. The electrical subsystem 100 has first and second leads 180,182 that extend to the outside surface 135 of the body 18 of the camera 11. An component-bearing-label 128 has an attachment portion 126 that is adhered to the outside surface 135 and an electrical component 184 that is joined to the attachment portion 126. The electrical component 184 has first and second terminals 186,188. The attachment portion 126 holds the terminals 186,188 against the leads 180,182 in electrically conductive contact. The electrical component 184 can be of one-piece with the attachment portion 126 or a discrete part in the same manner as the optical components 125 above-discussed.

The electrical subsystem 100b and electrical component 184 together form an electrical system that provides a particular function or set of functions, such as the functions of an electronic flash or power supply or controller. The function or functions are enabled when the electrical subsystem 100b and electrical component 184 are operatively connected and are disabled when the electrical subsystem 100b and electrical component 184 are disconnected.

Figure 30:
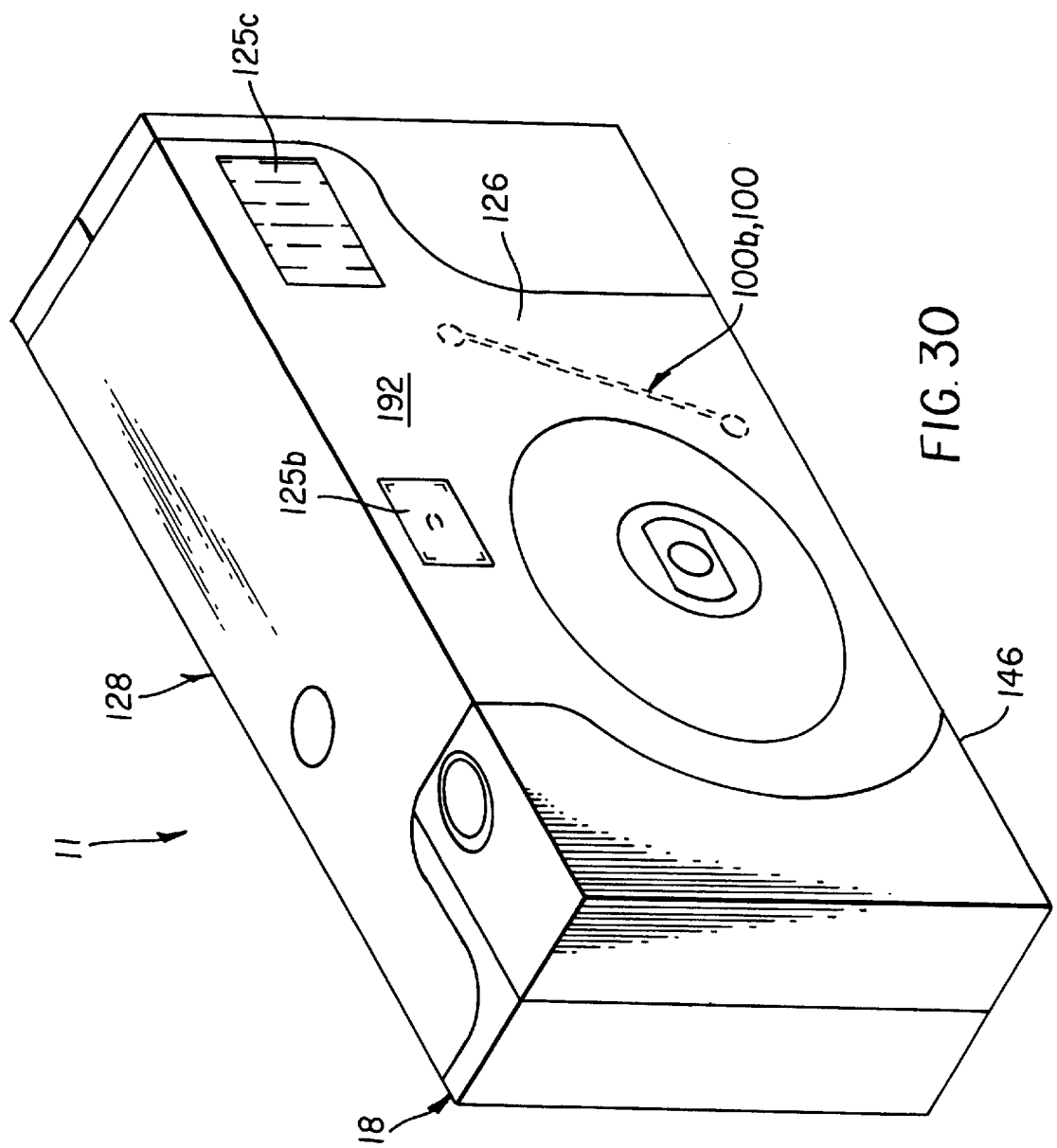
FIG. 30 is a perspective view of another embodiment of the camera.
Figure 33:
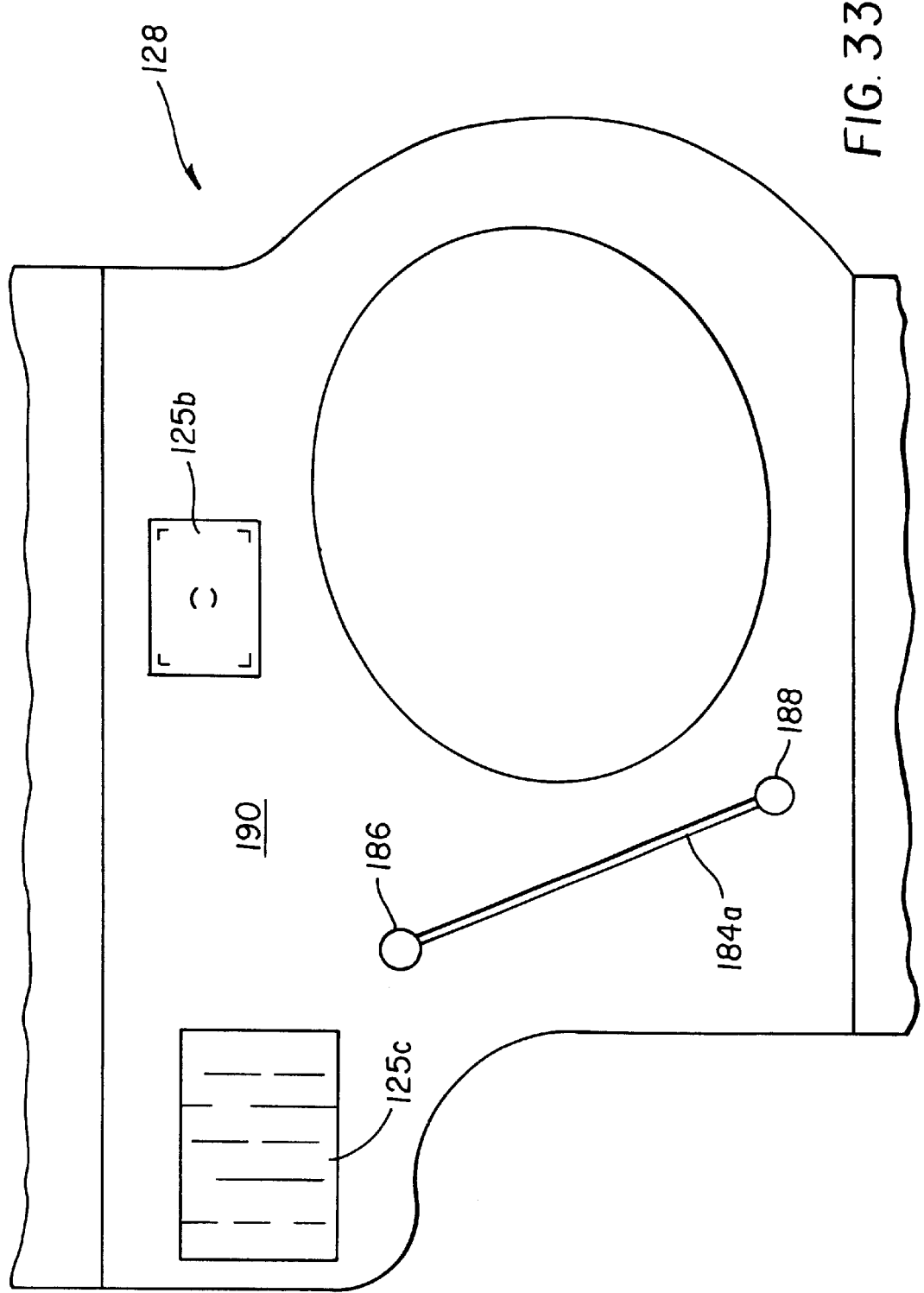
FIG. 33 is a plan view of the inside surface of the label of the camera of FIG. 30 showing the front segment and parts of the top and bottom segments of the label.

For convenience, the camera 11 is generally discussed herein in terms of a single electrical subsystem 100 and a single attachment portion 126 bearing one electrical component 184. This is not limiting. A camera 11 can have multiple electrical subsystems 100 each having its own associated electrical component 184 or multiple electrical subsystems 100 can share a common electrical component 184. A single attachment portion 126 can include multiple electrical components 16 or each electrical component 184 can have a separate attachment portion 126. A camera 11 can also include one or more conventional electrical systems that do not have electrical components 16 provided by an component-bearing-label 128. The same component-bearing-label 128, as shown in FIG. 30, can have both electrical and optical components 184,125. It will be understood that different combinations of component-bearinglabels and components can be provided in the same manner as the described embodiments.

The camera 11 is also generally described herein in terms of an component-bearing-label 128 mounted on the outside surface 135 of the body 18. The component-bearing-label can be mounted on an inside surface of a cover or on the frame. This is not currently preferred, since it can make placement of electrical subsystem leads more difficult.

The component-bearing-label 125 has an inner surface 190 in contact with the body 18 and an outer surface 192 facing outward. The attachment portion 126 of the component-bearing-label 128 can fully cover an electrical component 184 such that the electrical component 184 is interior to the outer surface 192. The attachment portion 126 of the component-bearing-label 128 can also have an opening (not separately illustrated) through which part of the electrical component 184 is exposed. The component-bearing-label 128 has multiple layers; the innermost of which is a layer of adhesive. Pressure-sensitive adhesive is convenient for this purpose, but other kinds of adhesives can be used.

The electrical component 184 can be rigid or flexible and can be flat and similar in thickness to the attachment portion 126 of the component-bearing-label 128 or three-dimensional with a greater thickness than the attachment portion 126 of the component-bearing-label 128. Flexible, flat electrical components 16 are preferred, since such electrical components 16 are easy to position anywhere on the body 18 of the camera 11. Electrical components 16 can be uninsulated if positioned interior to the attachment portion 126 of the component-bearing-label 128, as shown in FIG. 30. Insulation is provided by the attachment portion 126 and the body 18. If the component-bearing-label 128 has multiple layers, then the electrical component 184 can be positioned between layers (not shown). In FIG. 30, the electrical component 184 is a circuit trace, that is, a conductive line deposited on the inner surface 190 of the insulating attachment portion 126.

The nature of the electrical component 184 is largely a practical question. The electrical component 184 can be a single conductor, an electrical system lacking only a single conductor or anything in between. The selection of a particular electrical component 184 requires a balance of a number of competing considerations. For example, an electrical component 184 could be reusable, but it is expected that an electrical component 184 will be used once and then discarded with the remainder of the component-bearing-label 128 prior to camera 11 reloading. Another consideration is that the electrical component 184 is on the outside surface 135 of the body 18 of the camera 11 and is, thus, subject to wear and damage. These considerations argue for the use of electrical components 16 that are inexpensive and require a minimal expenditure of resources. On the other hand, assembly of the electrical component 184 on the camera body 18 is simple, since the electrical component 184 is joined to and assembled with the attachment portion 126 of the component-bearing-label 128. This consideration argues in favor of the use of more complex electrical components 16. Other considerations to be considered include esthetics and overall value to the user.

Figure 36:
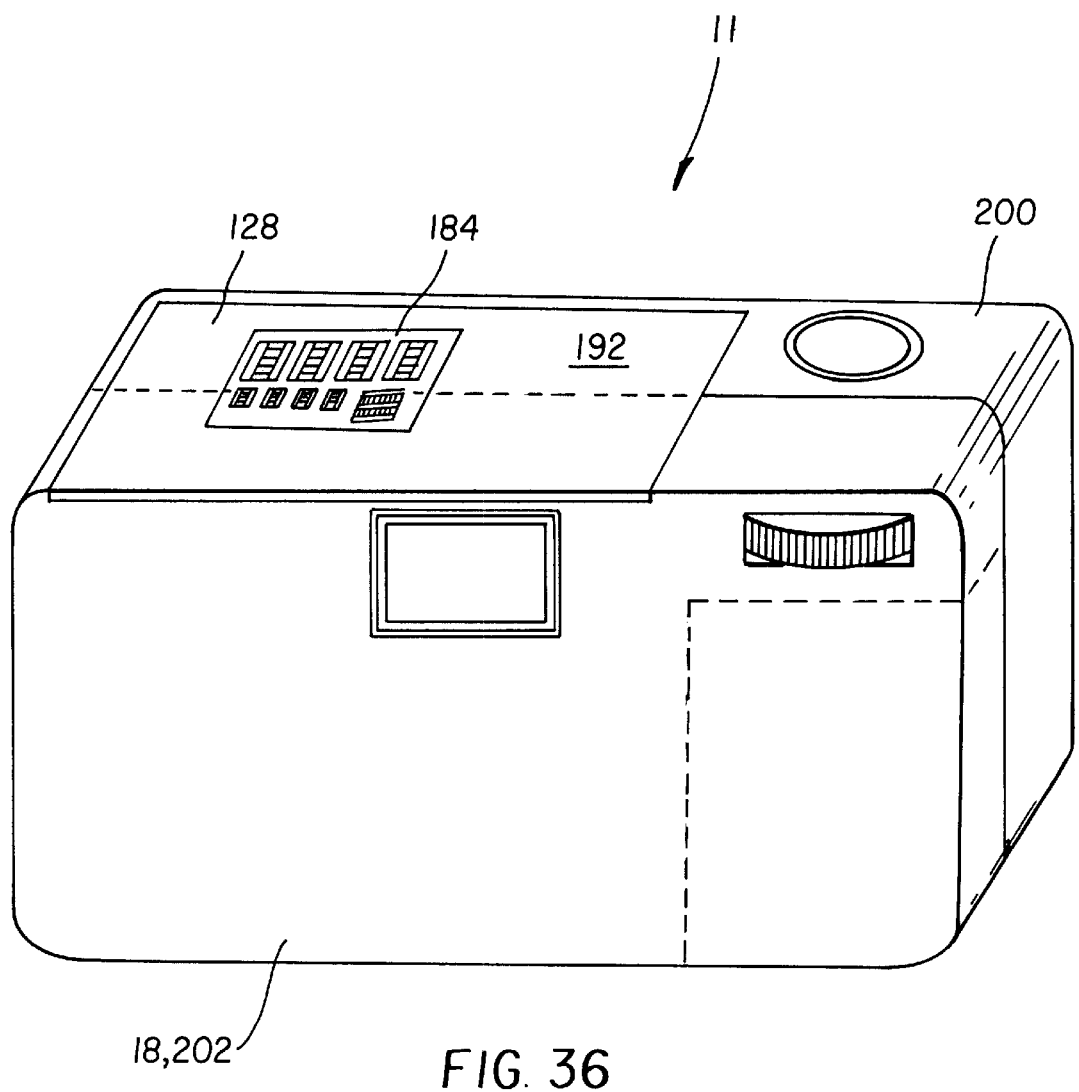
FIG. 36 is a partial perspective view of another embodiment of the camera in which the openable cover part is the rear cover and the breakable component is a liquid crystal display. The rear cover is shown in a closed configuration and the electrical component is unbroken. The location of an optional film door is indicated by a dashed line.
Figure 37:
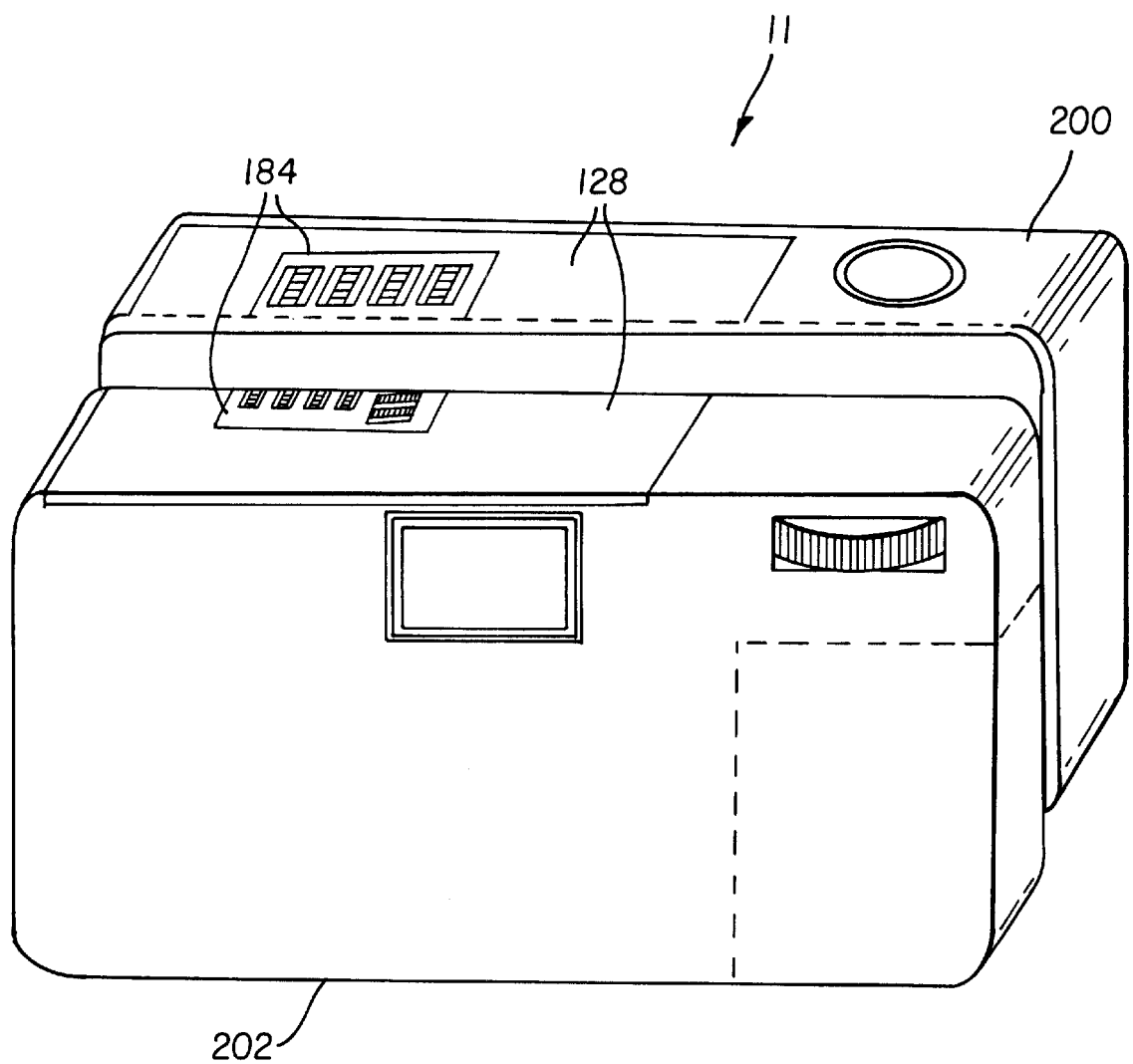
FIG. 37 is the same view as FIG. 36, but the rear cover is shown in an unclosed configuration and the electrical component is broken.
Figure 38:
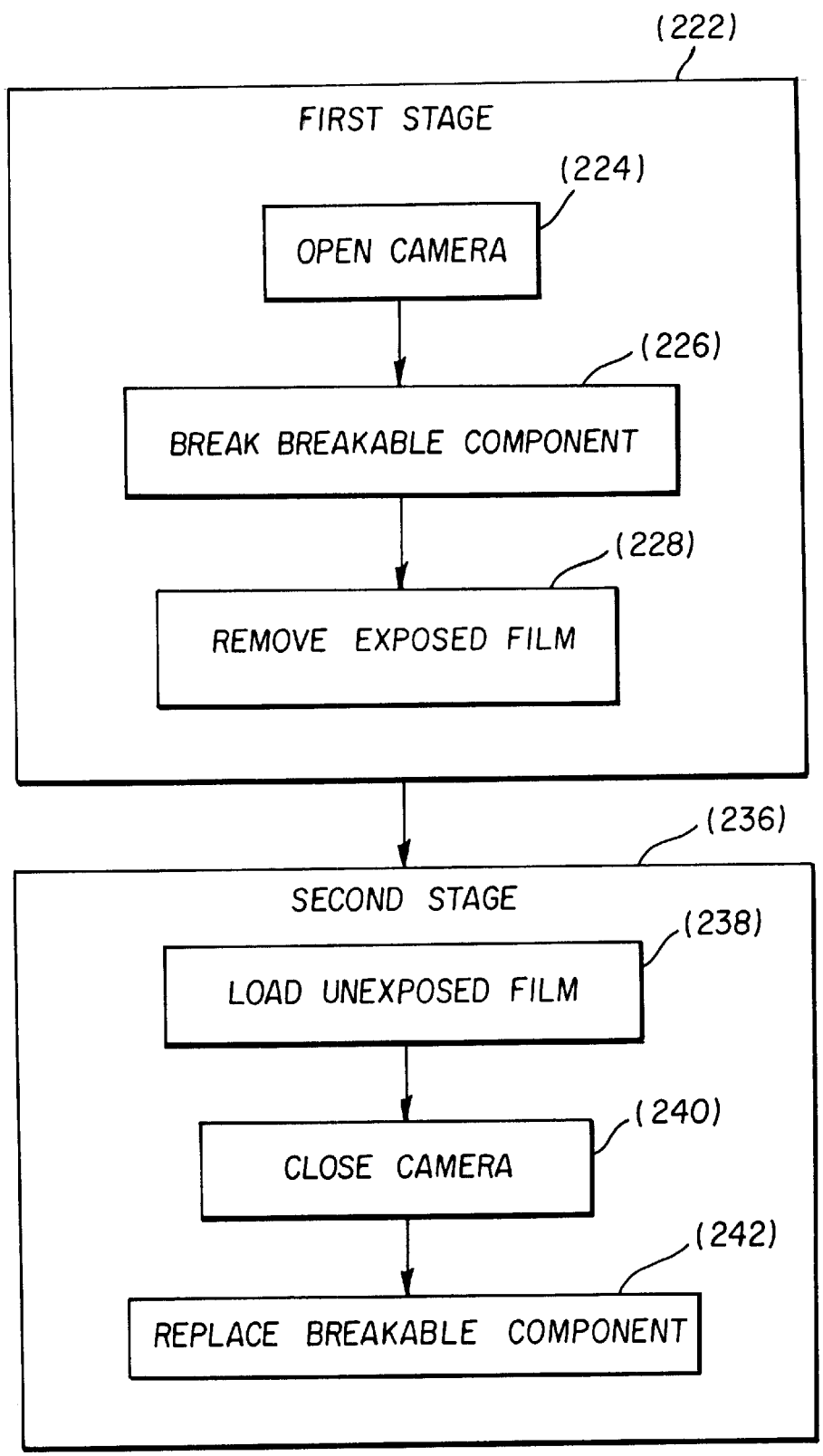
FIG. 38 is a diagram of the general features of the recycling method.

Referring to FIGS. 30–33, the electrical component 184 is a circuit trace 184a and the subsystem 100c is the circuit elements of a flash system. The flash system is disabled if the circuit trace 184a is disrupted or removed. Referring to FIGS. 36–37, the electrical component 184 is a voltage indicator 184b that displays the charge on the flash capacitor (not illustrated) of the flash system. Strength indicators usable on disposable dry storage batteries are suitable for use as the voltage indicator. For example, U.S. Pat. No. 5,789,100, hereby incorporated herein by reference, discloses a wide variety of indicators including ones using shape memory alloys, color indicating materials, liquid crystal displays, and electroluminescent materials such as organic electroluminescent materials.

Indicators used on batteries generally have a switch which must be actuated to operate the indicator. The switch prevents battery drain during storage. In the camera 11 having the flash circuit shown in FIG. 36–37, a switch is unnecessary; since the indicator is isolated from the battery when the flash is not being used. This flash circuit is suitable for an indicator, such as a liquid crystal display, that requires a voltage much lower than the voltage across the flash capacitor. Other suitable flash circuits are well known to those of skill in the art. The flash system can include a battery indicator as shown in, in addition to, or instead of the capacitor charge indicator. In this case, a switch would be connected to the indicator to prevent battery drain.

Referring again to FIGS. 36–37, a currently preferred voltage indicator is substantially planar and has a two-dimensional indicator face. This flat shape allows easy placement on a variety of locations on a flat or curved camera body 18. The two-dimensional indicator face is easy for the user to read. The voltage indicator has a liquid crystal display and electrical connectors to the flash subsystem 100. The liquid crystal display has, a pair of opposed electrodes and a single liquid crystal cell or an array of liquid crystal cells disposed between the electrodes. The electrodes are electrically connected to the flash subsystem 100 through the terminals 186,188. Each cell is subject to a visible phase change responsive to the application of a particular voltage across the terminals 186,188. With the single cell liquid crystal display, the voltage corresponds to the presence of a full charge on the flash capacitor and the voltage display is consulted by the user of the camera 11 in the same manner as a flash ready light. With the multiple cell liquid crystal display, the cells respond to a sequence of different voltages corresponding to different partial charges and a full charge on the flash capacitor. The outside surface of the component-bearing-label 128 has indicia, aligned with the different cells, that indicate flash distances appropriate for the different charge states. The user can take a picture when a sufficient charge is reached for the distance required for flash coverage of the subject matter. Other indicators than a liquid crystal display can also be used similarly to provide an incremental readout proportional to a voltage across the terminals 186,188.

Figure 42A:
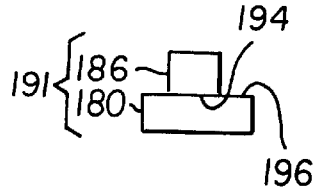
FIGS. 42a–42f are semi-diagrammatical views of examples of different types of terminal lead pairs and some accompanying structures.
Figure 42B:
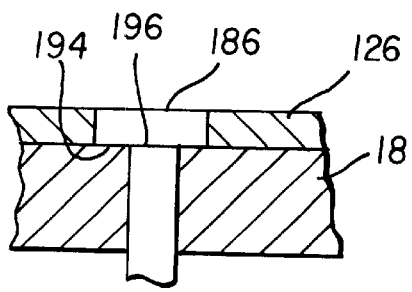
Figure 42C:
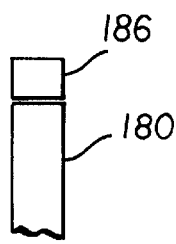
Figure 42D:
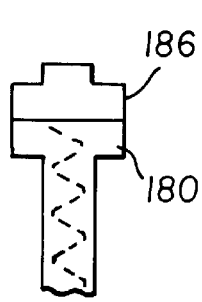
Figure 42E:
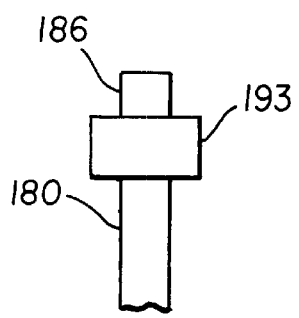
Figure 42F:
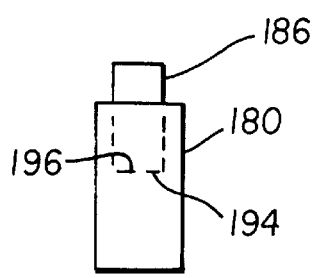

Although the electrical component is generally described herein in terms of a pair of terminals, the number of terminals and leads for a particular component can be larger or smaller. The terminals 186,188 and leads 180,182 can have a variety of configurations. FIGS. 42a–42f illustrates some examples of these configurations for a single terminal-lead pair 191. It is highly preferred that the terminals 186,188 and leads 180,182 contact each other in non-mating relation as shown in FIGS. 42a–42e. Mating terminal-lead pairs 191, such as the pair shown in FIG. 42f, are not readily usable with Bernoulli effect labeling. Terminals 186,188 and respective leads 180,182 can contact each other directly, as shown in FIGS. 42a–42d for non-mating relation, and FIG. 42f for mating relation. Terminals 186,188 and respective leads 180,182 can contact indirectly through an intermediate conductor 193, in mating or non-mating relation. (As used herein, "non-mating relation" is exclusive of mating contact between two parts and is also exclusive of contact between first and second parts through an intermediate where a first part and second parts are each in mating relation with the intermediate.) Indirect contact between respective terminals 186,188 and leads 180,182 is more complex than direct contact and is therefore not preferred. It is further preferred that respective terminals 186,188 and leads 180,182 are simply butted together and held in place by the adhesion of the attachment portion 126 of the component-bearing-label 128 to the body 18. To help maintain abutting relation one or both members of a terminal-lead pair 191 can be resiliently biased toward the other, by an internal spring 193 (shown in FIG. 42*d*), an external spring (not shown) or inherent resilience of the material of the terminal 186,188 or lead 180,182.

The parts of the terminals 186,188 and leads 180,182 that are butted together and provide a conductive path are referred to herein as contact portions 194,196, respectively. Contact portions 194,196 of non-mating terminal-lead pairs 191 shown in the figures are flat. Contact portions 194,196 can be curved. Referring to FIG. 42*b*, for example, the leads 180,182 are wires that extend through holes in the body 18 and have contact portions 196 as the ends of the wires, and the contact portions 194 of the terminals 186,188 are small pads on the inner surface 190 of the component-bearing-label 128.

Contact portions 194,196 of terminal-lead pairs can be the same size or can differ. The size of each contact portion 194,196 is a function of the electrical load and the area of contact between the members of the terminal-lead pair 191. It is preferred, for reasons of circuit design and manufacturing economy, that the contact portions 194,196 for respective terminals 186,188 and leads 180,182 are relatively close to each other in size and small relative to the size of the component-bearing-label 128. Small contact portions 194,196 are also easier to hold together so as to provide good electrical contact. With small contact portions 194,196, the area of adhesion between the attachment portion 126 and the body 18 in the immediate vicinity of the contact portions 194,196 can be many times the size of the contact portions 194,196. Small contact portions 194,196 are also favored to reduce electrical resistance and esthetic constraints on design of the component-bearing-label. A preferred terminal-lead pair 191 has a smaller contact portion 194 or 196 that has an area that is more than 25 percent of the area of the other contact portion 196 or 194, or more preferably 50 percent, or still more preferably 75 percent. The same reasons support maximizing the percentage of each contact portion 194 or 196 in contact with the other 196 or 194. In a preferred embodiment, each contact portion 194 and 196 has more than 25 percent of its area in contact with the other contact portion 196 or 194. Fifty percent in contact is more preferred and 75 percent still more preferred.

With many labeling techniques, the minimum tolerance for a center to center spacing for the members of a terminal-lead contact pair is 0.8 mm. For small leads and terminals, Bernoulli labelling methods and apparatus are preferred, as above discussed, to provide a terminal center to lead center tolerance of 0.3 mm, or 0.2 mm, or 0.1 m.

Figure 43:
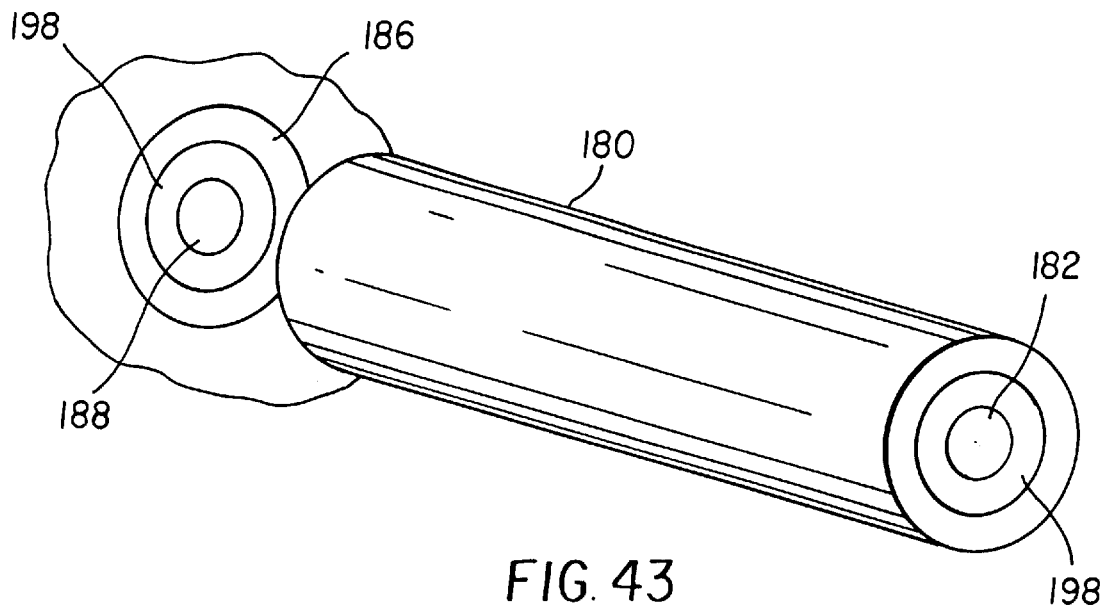
FIG. 43 is a semi-diagrammatical view of coaxial terminals and matching coaxial leads.
Figure 44:
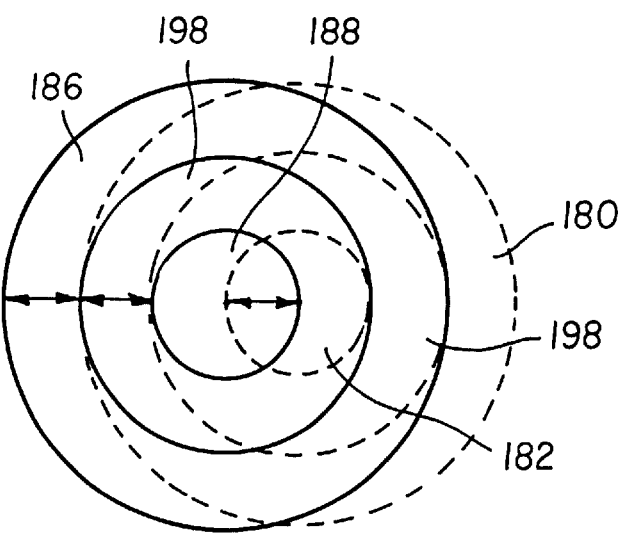
FIG. 44 is a diagram of the extent of overlap of contacting coaxial terminals and leads of FIG. 43.

In the embodiments previously discussed, each terminal-lead pair 191 is positioned independently; however, terminals 186,188 or leads 180,182 or both can be ganged in a regular array or other pattern. In FIGS. 43–44, terminals 186,188 are coaxial with one of the terminals cylindrical and the other shaped like a circular tube. An insulating sheathe 198 separates the two terminals. The leads 180–182 have the same configuration, including another insulating sheathe 198, and preferably the same dimensions. In a particular embodiment the radial thickness of the sheathes and the tubular terminal and lead are all equal to the radius of the cylindrical terminal and lead. It is preferred that the radius is 0.6 mm, or more preferably 0.4 mm, or still more preferably 0.2 mm.

Camera Having Component-bearing-label Including Breakable Component

Referring now to FIGS. 20–23, 28–29, and 34–37, the body 18 of the camera 11 includes a primary cover section 200 and at least one openable or secondary cover section 202. The openable cover section 202 is movable relative to the primary cover section 200 from a closed position to an unclosed position to open the body 18. The openable cover section 202 can be a door, such as a film door 202*a* that is opened or removed for removal of an exposed film cartridge 204 or a battery door (not shown) that is opened or removed for removal of a battery, or a cover, such as a back cover 152 that is separated from the front cover 150 and frame assembly to open the camera 11. An component-bearing-label 128 overlaps and is, preferably, adhered to the primary cover section 200 and one or more secondary cover sections 202. The component-bearing-label 128 has an attachment portion 126. The attachment portion 126 has the features described elsewhere herein.

The camera 11 has one or more breakable components 216 joined to the attachment portion 126. A camera 11 can have multiple component-bearing-labels 128. Multiple breakable components 216 can be provided on a single attachment portion 126. Multiple subsystems 100 can be completed by a single component 216. For convenience, the camera 11 is generally discussed herein as having a single breakable component 216, single subsystem 100, and single component-bearing-label 128. Like considerations apply for multiple items.

The breakable component 216 is part of a camera system that provides one or more camera functions. The system includes a subsystem 100 mounted in the body 18. The breakable component 216 can degrade recycling operations or recycled products, if retained when the camera 11 is recycled. In currently preferred embodiments, the breakable component 216 has the features of an optical component 125 or electrical component 184 as previously described. The subsystem 100 has the features of the corresponding optical subsystem 100*a* or electrical subsystem 100*b*.

The attachment portion 126 supports the breakable component 216 on the body 18 in operative relation to the respective subsystem 100. For example, FIGS. 20–23 and 26–27 illustrate a breakable component 216 that is a viewfinder lens 125*b*. The respective subsystem 100 includes the viewfinder housing 138. The system can include a second viewfinder lens 139 that is part of the subsystem 100 or a second viewfinder lens 125*b* that is part of the attachment portion 126. The latter can also be a breakable component 216. The viewfinder lens 125*b* is held by the attachment portion 126 in concentric alignment with an optical axis 132 defined by the viewfinder housing 138 and the other viewfinder lens. FIGS. 20–21 also illustrate a breakable component 216 that is a counter window 125*a* over the film counter 134 and another breakable component 216 that is a flash lens 125*c*. The flash lens 125*c* is mounted to the body 18 over a reflector 206. A flash tube 208 is mounted in the reflector 206 and both flash tube 208 and reflector 206 are supported by a circuit board 210.

Figure 29:
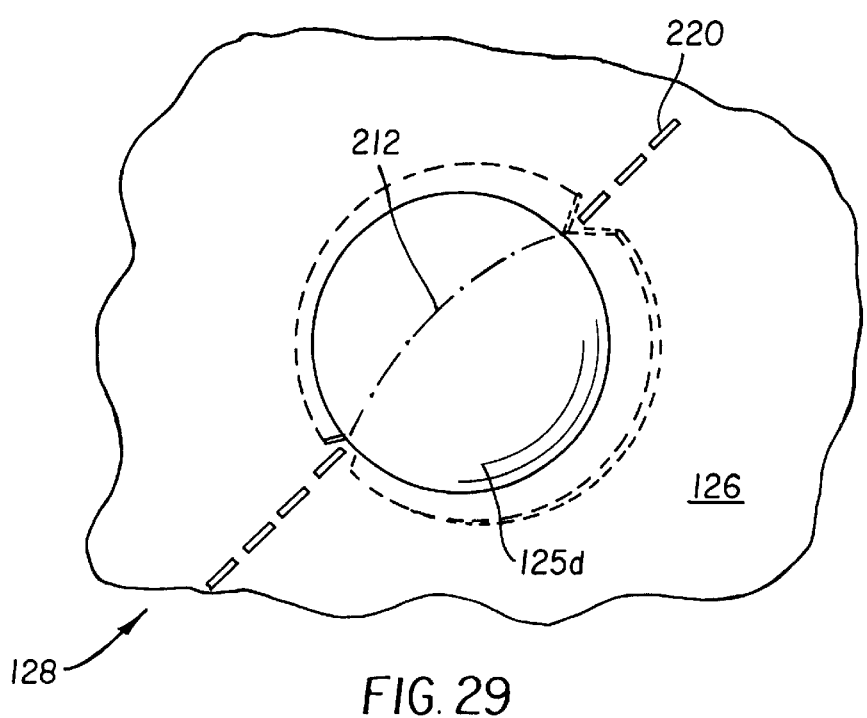
FIG. 29 is partial perspective view of the lens mount and label of the camera of FIG. 28.
Figure 29A:
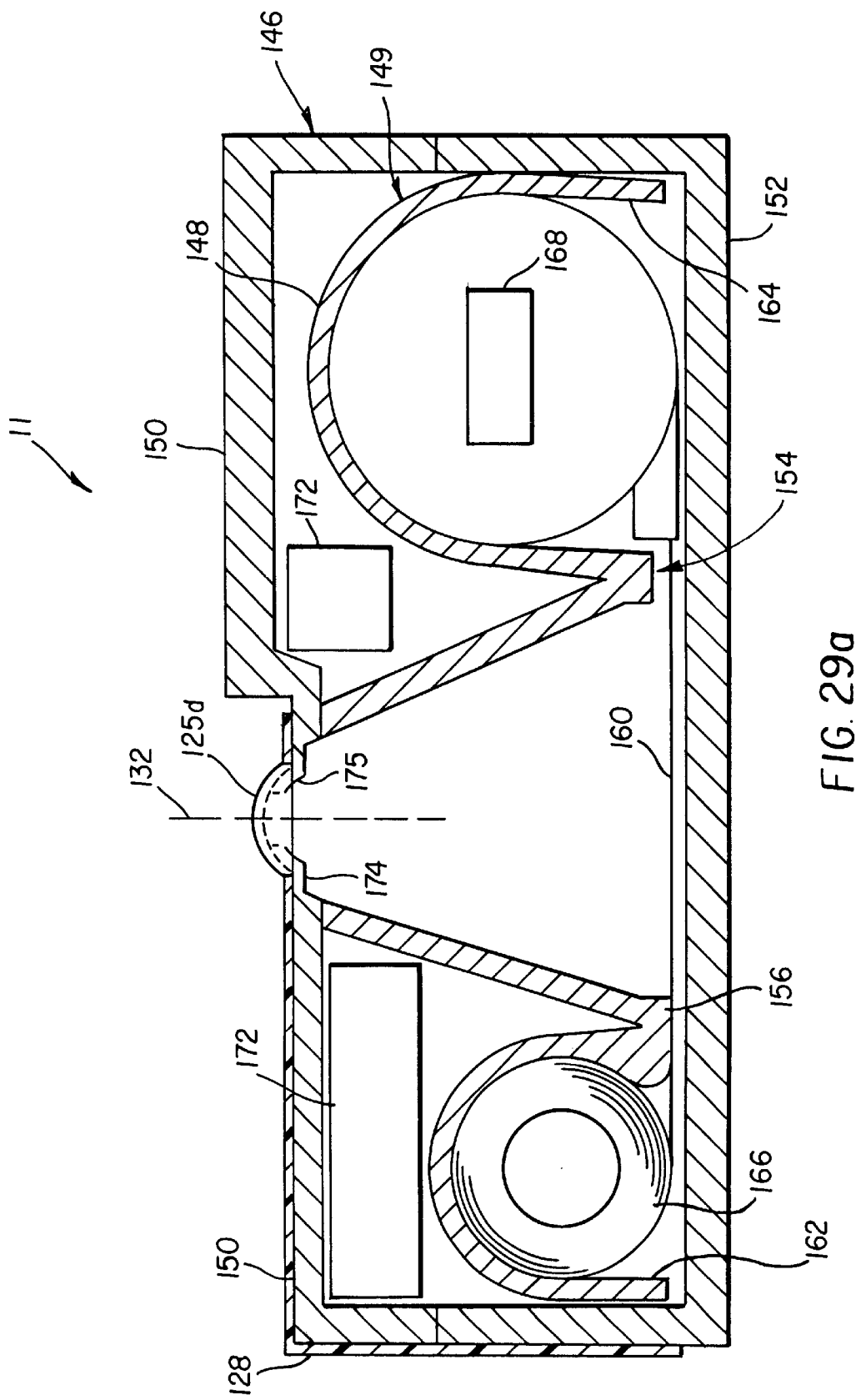
FIG. 29a is a semi-diagrammatical cross-sectional view of a modification of the camera of FIG. 28.

In the camera shown in FIGS. 29 and 29*a*, the breakable component is a taking lens element 125*d* that is held on the lens mount 174 by the attachment portion 126. The taking lens element 125d has a line of weakness (indicated by dot-dash line 212) resulting from a pair of opposed notches 214.

Referring now to FIGS. 30–37 and 42a–44, the component-bearing-label 128 has a breakable component 216 that is an electrical component 184. FIGS. 30–35 illustrates breakable components 216 that are circuit traces 184a. In FIGS. 36–37, the electrical component 216 is a liquid crystal display. The respective subsystem 100 is an electrical circuit, such as a flash unit. The electrical circuit has first and second electrical leads 180,182. The electrical component 184 has first and second terminals 186,188. The attachment portion 126 of the component-bearing-label 128 holds the terminals 186,188 in electrical contact with respective leads 180,182.

When the openable cover section 202 is moved from the closed position to the unclosed position, the attachment portion 126 is disrupted from a use configuration to a replacement configuration. In the use configuration, as shown in FIGS. 20, 22, 24–27a, 28a, 29a–32, 34, and 36, the attachment portion 126 is smoothly fit to the body 18 of the camera 11. When openable cover section 202 is moved to the unclosed position, the attachment portion 126 of the component-bearing-label 128 is tensioned. In response, the attachment portion 126 deforms into a replacement configuration, as shown in FIGS. 21, 23, 35, and 37. In the embodiments illustrated, during the deformation the attachment portion 126 looses adhesion and deflects outward from the body 18, stretches, or tears, or some combination of these occur.

The tensioning of the attachment portion 126 also tensions the breakable component 216, which then breaks. The breaking is a disruption that prevents reuse without repair or is irreparable. The extent of tensioning imposed by the attachment portion 126 on the breakable component 216 is predictable, from the geometry of the movement of the openable cover section 202 and the response of the attachment portion 126 to that movement; and the breakable component 216 is selected to fail under that tensioning. The nature of the breakage is not critical. Convenient breakage modes are inelastic stretching and fracture or tearing along a line of weakness such as a tear line or other friable portion. The term "tear line" is used herein to refer to any narrow, linearly extensive feature of an component-bearing-label 128 which is weaker than adjacent portions to the component-bearing-label 128 such that the component-bearing-label 128 yields along the feature, such as a row of spaced perforations or other stress concentrating discontinuities.

It is preferred that the breakage is irreparable and catastrophic. The damage incurred in the "irreparable breakage" prevents usage of the component 16 in the same manner that the component 16 was usable before the irreparable breakage. In other words, breakage is irreparable if it is impossible to repair or can only be repaired at a cost in excess of the replacement cost of the item. For example, the viewfinder lens 125b shown in FIG. 22 has fiducials 218 that indicate the limits of the image frame when a picture is captured. After irreparable breakage, shown in FIGS. 21 and 23, the viewfinder lens 125b cannot be repaired in any practical manner, which would permit all the fiducials 218 to be used to compose a picture.

Breaking is catastrophic if a major part of the breakable component 216 has damage that is perceptible by an unaided user on ordinary inspection. Breaking of brittle components 16 or gross inelastic stretching of pliable components 16 is catastrophic. Catastrophic breakage helps ensure that cameras 11 having breakable components 16 are not recycled in degraded or badly repaired form.

The attachment portion 126 and breakable component 216 can be made in two pieces with the breakable component 216 being joined to the attachment portion 126 during camera 11 assembly. This is not preferred, however, since there is a risk that the adherence of the breakable component 216 to the attachment portion 126 may fail before the breakable component 216 fails. It is preferred that the attachment portion 126 and breakable component 216 are of one-piece, that is made as a continuous part of single structure. For example, an optical component 125 can be a part of a continuous layer of a multiple layer component-bearing-label 128 and an electrical component 184 can be an area of conductive material deposited on a support that is continuous with the rest of the component-bearing-label 128.

Referring now to FIGS. 20–23, the component-bearing-label 128 has a first breakable component 216 that is a viewfinder lens 125b of the camera 11, a second breakable component 216 that is a flash reflector lens 125c, and a third breakable component 216 that is a counter lens 125a. When the openable part is opened, the component-bearing-label 128 is stretched inelastically and the viewfinder lens 125b, flash reflector lens 125c, and counter lens 125a are all broken. As shown in the figures, this breaking is by inelastic deformation. This mode of breakage can be impractical for thicker lenses. In that case, a more convenient mode of breakage can be cracking along a line of weakness, as shown in FIGS. 29–29a. When the rear cover 152 (which for this embodiment is the openable cover section 202) is separated from the rest of the body 18, the taking lens element 125d is tensioned by the attachment portion 126 and breaks along the line of weakness 212. The attachment portion 126 of the component-bearing-label 128 has a tear line 220 that extends through the notches 214 to the friable area 212 of the lens element 125d.

Figure 23:
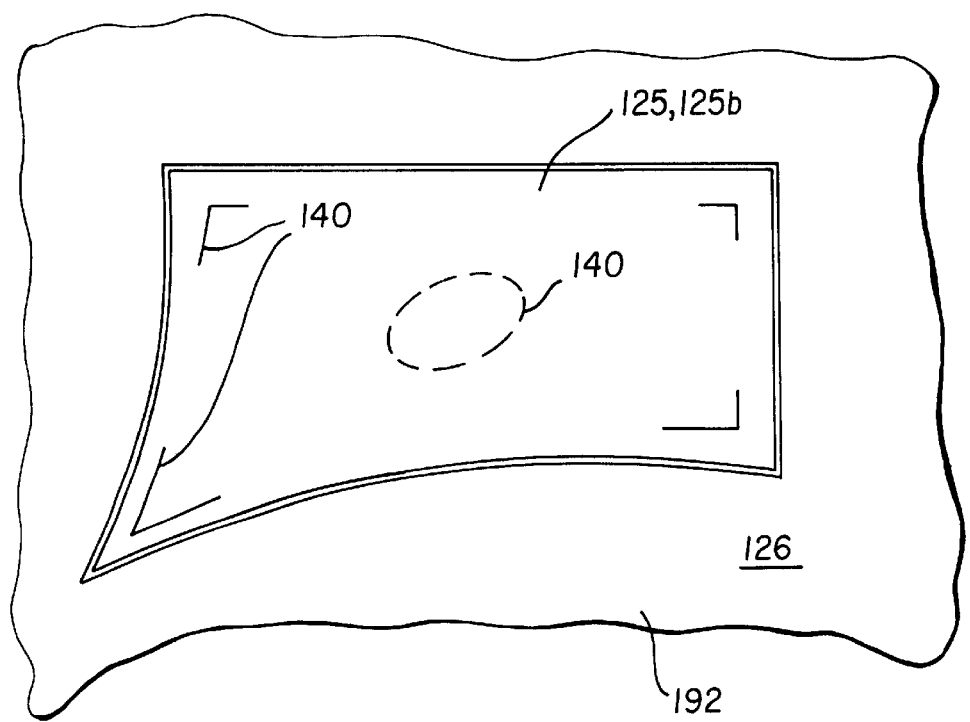
FIG. 23 is the same view as FIG. 22, but the viewfinder lens is in a broken configuration.
Figure 24:
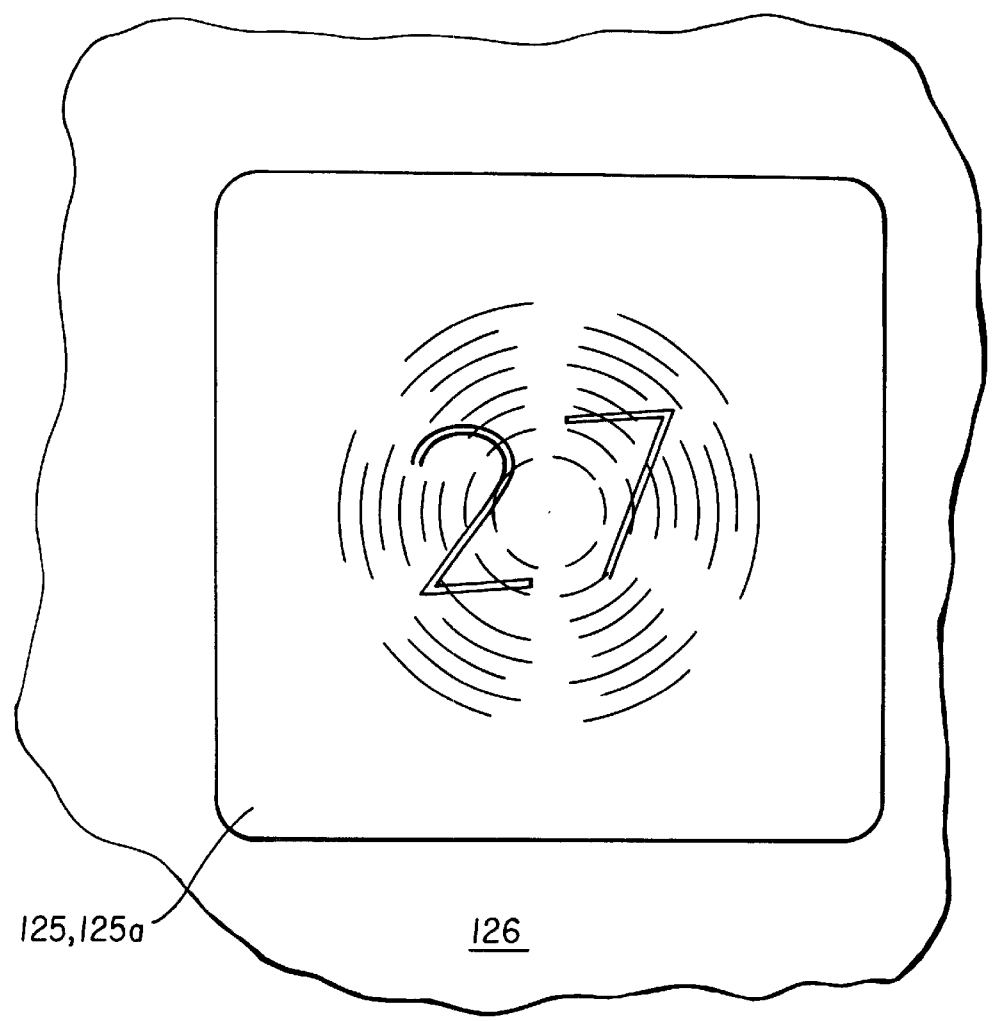
FIG. 24 is a partial top plan view of the camera of FIG. 22 showing the counter and counter magnifier lens and a section of the attachment portion of the label.
Figure 25:
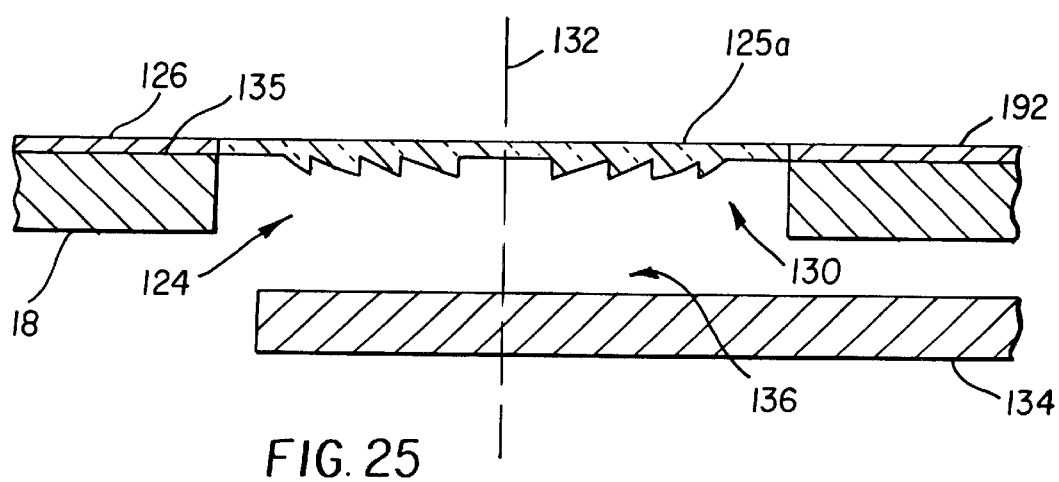
FIG. 25 is a cross-sectional view of the label of the camera of FIG. 22 showing the counter magnifier lens and a section of the attachment portion of the label.

Referring specifically to FIGS. 20–23, the viewfinder lens 125b breaks by inelastic stretching and has the broken configuration shown in FIGS. 21 and 23. The viewfinder lens 125b cannot be restored to the unbroken configuration. The damage is catastrophic. The entirety of an image seen through the viewfinder 125b is grossly distorted and the fiducials 218 are no longer square. The viewfinder 125b cannot be restored and, unrestored, cannot be used to realistically visualize a scene for picture taking. The lens 125b has an obvious distortion that will be apparent to anyone recycling the camera 11. The component-bearing-label 128, including the viewfinder lens 125b, is replaced to recycle the camera 11. The breakage of the viewfinder lens 125b helps ensure that the condition of the lens will be assessed when the camera 11 is recycled. Earlier occurring wear and damage might not otherwise be noticed. Catastrophic damage ensures that the condition of the lens 125b will not be easily missed. Irreparable damage ensures that the viewfinder lens 125b will be replaced with a new lens when the camera 11 is recycled. In addition to preventing the use of possibly worn or damaged viewfinder lenses, this requirement of a new viewfinder lens helps prevent possible mismatches, after recycling, between the format set for the film reloaded in the camera and the format indicated by the fiducial of the viewfmder lens and light cone of the flash lens. (With some film types, such as Advanced Photo System™ film, the format of the film can be preset by prerecording optical or digital codes. The format determines the aspect ratio of the resulting photographic prints. Standard formats are "C", "H", and "P".) Similar considerations apply to other breakable components commensurate to the risk of damage during ordinary use and risk of misallocation during recycling. For example, unlike the viewfinder lens and flash reflector lens, the counter lens is independent of film type and format, and wear and tear on the counter lens is unlikely to greatly damage functionality except when cameras are subject to severe usage.

Figure 34:
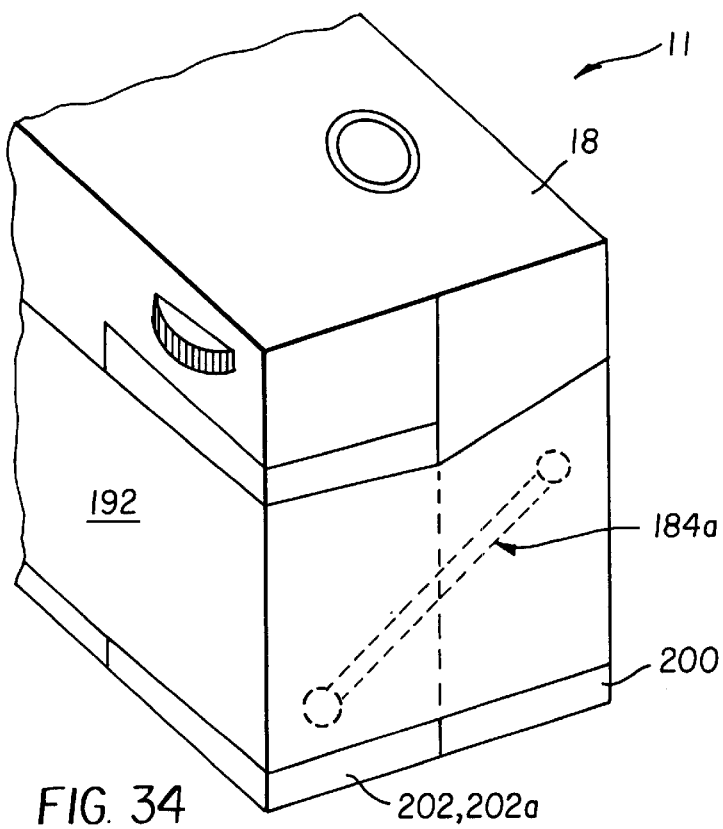
FIG. 34 is a partial perspective view of another embodiment of the camera including an openable film door and a label including a breakable electrical component. The film door is shown in a closed configuration and the electrical component is unbroken.
Figure 35:
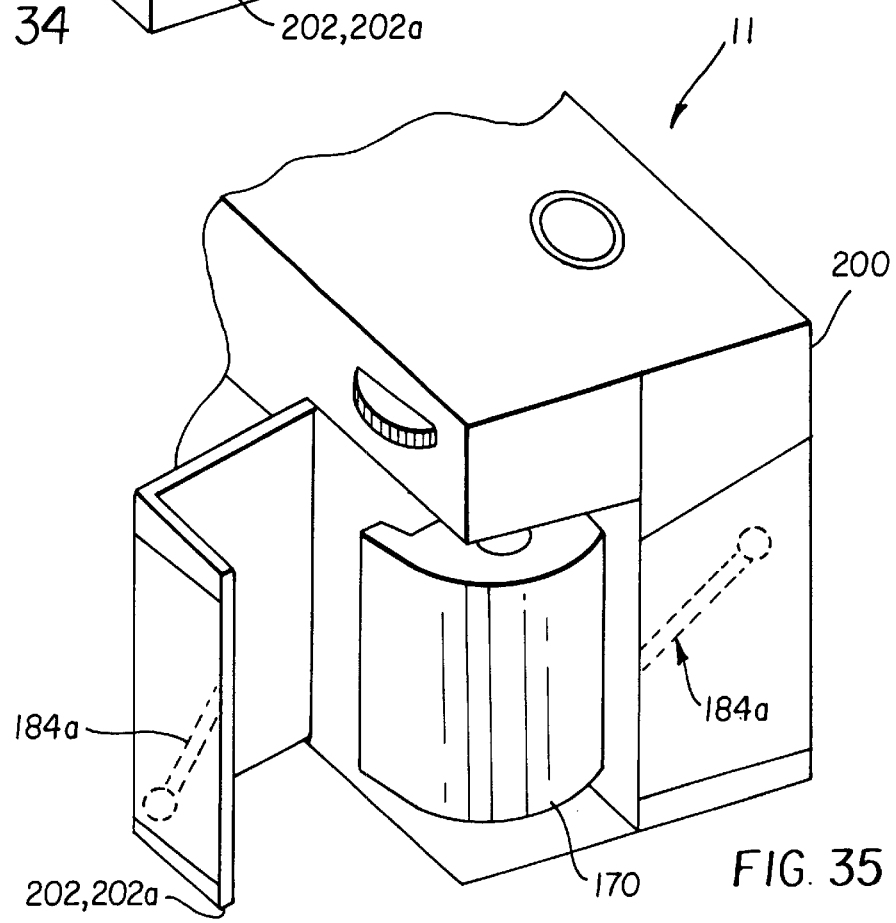
FIG. 35 is the same view as FIG. 34, but the film door is shown in an unclosed configuration and the electrical component is broken.

Referring now to FIGS. 34–35, the circuit trace breaks by tearing along a tear line 220 in the attachment portion 126 that crosses the circuit trace 184a. The breakable component 216 of the camera 11 shown in FIGS. 36–37 is a liquid crystal display that breaks in the same manner as the circuit trace.

In embodiments having electrical components as breakable components, the openable cover 202, when opened, disrupts the component-bearing-label 128 sufficiently to interrupt the electrical contact between leads 180,182 of an electrical subsystem 100 and terminals 186,188 of the electrical component 184. For example, the flash system can be disabled when the circuit trace is disrupted or removed during camera recycling. This embodiment is useful, for example, in a one-time use camera 11 in which a flash battery is not removed when film is removed for processing. Since the flash circuit is disabled, jostling of used camera 11 bodies during handling for recycling is unlikely to cause the flash circuit to charge and discharge. Such accidental charging and discharging would be wasteful of batteries and distracting to workers. The circuit trace of FIGS. 34–35 is not catastrophically damaged by tearing along the tear line, but tearing of some other electrical components 16 that are more difficult to repair, such as a liquid crystal display, as shown in FIGS. 36–37, is catastrophic.

Referring now to FIGS. 38–41, in a one-time use camera recycling method, at a first stage (222) the camera 11 is opened (224), breaking (226) the breakable component 216, and exposed film is removed (228) for processing. (The component-bearing-label having the breakable component that is destroyed when the camera 11 is opened, is referred to here as the "original component-bearing-label".) Destroying (226) the breakable component 216 disables the camera system that includes the breakable component 216. For example, as shown in FIGS. 30–31, breaking a component 16 that is a circuit trace severs an electrical connection.

The opening (224) of the camera 11, that is, that movement of an openable cover section 202 from the closed position to the open position can be required for film removal (228) or can be separate from film removal. FIG. 30 illustrates a camera 11 having a film door that when opened, breaks breakable components 216 of the component-bearing-label 128. The steps of the method followed for this camera are given in FIG. 41, with the combined opening and breaking indicated by line (230). After the exposed film has been removed (228), the rear cover is separated (232) from the front cover and frame.

Figure 39:
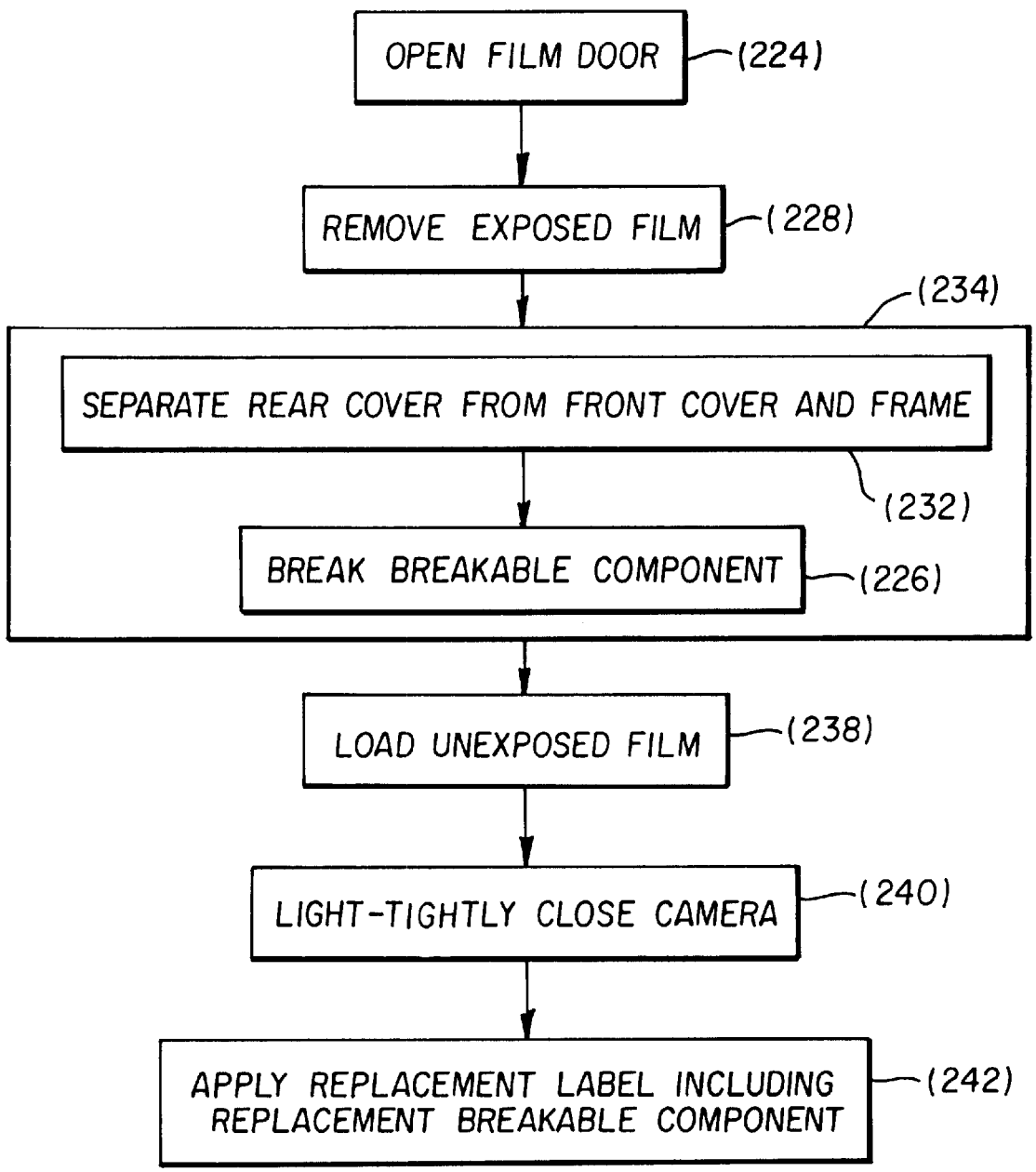
FIGS. 39–41 are diagrams of detailed steps of some different embodiments of the recycling method.
Figure 40:
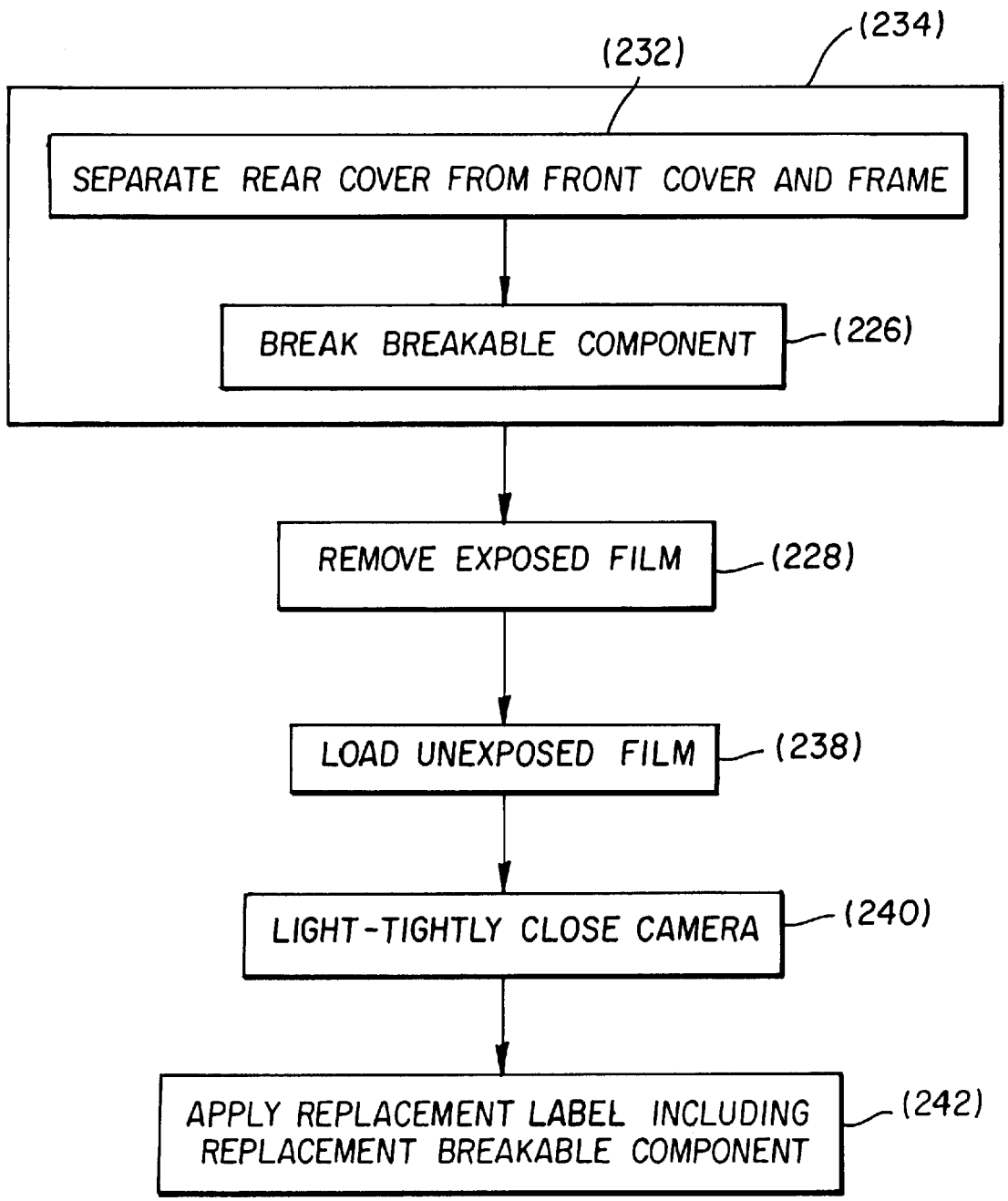
Figure 41:
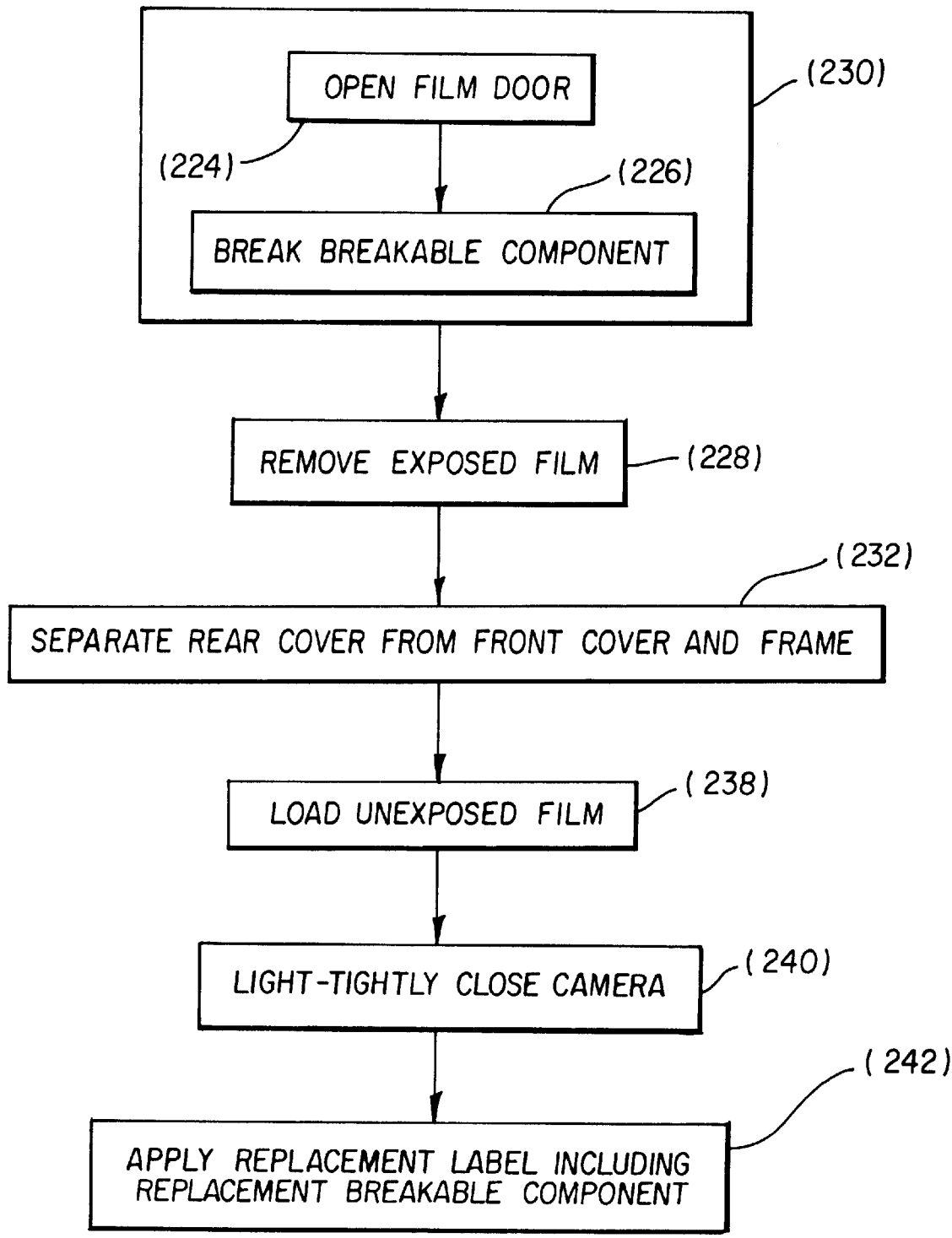

FIG. 36 illustrates a camera 11 having front and rear covers that open by separating (232). The openable cover portion can be extraneous to the camera's light lock, but it is preferred that the camera 11 is not light tight when the first cover portion is in the unclosed position. Referring to FIGS. 39 and 40, as line 234 is intended to indicate, the breakable component 216 breaks (226) when the covers are separated (232). Referring to FIGS. 36 and 39, the camera 11 can have an optional, separate film door that can be opened or removed (224) without breaking the breakable component 216 and before the covers are separated (232), to allow film removal. Referring to FIGS. 36 and 40, without the film door, the film is removed after the covers are separated.

At a second stage (236), following opening (224) of the camera and removal (228)of the film for processing; the camera 11 is recycled by loading (238) unexposed film, light-tightly closing (240) the camera 11, and replacing (242) the breakable component by applying a replacement component-bearing-label 128 to the camera body 18. Other procedures used in recycling one-time use cameras 11 can also be followed, such as, replacing covers and/or damaged or worn parts, and cleaning and testing retained parts. Since the replacement component-bearing-label 128 has an intact breakable component 216, the replacing of the component-bearing-label 128 reenables the earlier disabled camera 11 system.

The invention has been described in detail with particular reference to certain preferred embodiments thereof, but it will be understood that variations and modifications can be effected within the spirit and scope of the invention.

What is claimed is:

1. Method for assembling a critically positioned component on a larger body, said method comprising the steps of:
    floating a support sheet into alignment with a labeler head;
    joining the component and a predetermined attachment area of said support sheet while said support sheet is in said alignment with said labeler head;
    positioning said labeler head in alignment with a predetermined location on the body;
    contacting said body with said support sheet and said component while maintaining said alignments.

2. The method of claim 1 wherein said joining further comprises adhering said component to said attachment area.

3. The method of claim 1 wherein said method further comprises retaining said support sheet on said body following said contacting.

4. The method of claim 1 wherein said floating further comprises directing gas through a plurality of bores in said labeler head to form jets and combining said jets to form a film of flowing gas.

5. The method of claim 4 wherein said floating further comprises engaging and retaining said support sheet in said film of flowing gas.

6. The method of claim 5 wherein said floating further comprises moving said support sheet in said film of flowing gas relative to said labeler head.

7. The method of claim 6 wherein said floating further comprises stopping said moving of said support sheet relative to said labeler head.

8. The method of claim 7 wherein said stopping is prior to said positioning.

9. The method of claim 1 wherein said floating further comprises engaging and retaining said support sheet in a film of flowing gas.

10. The method of claim 1 further comprising mounting said component to said body.

11. The method of claim 10 wherein said mounting further comprises trapping said component between said body and said support sheet.

12. The method of claim 1 wherein said contacting further comprises permanently adhering said support sheet to said body.

13. The method of claim 12 wherein said support sheet is an indicia-bearing support sheet.

14. A method for assembling a critically positioned component on a larger body, said method comprising the steps of:

joining the component and a predetermined attachment area of a support sheet;
prior to said joining, floating said support sheet into alignment with a labeler head;
positioning said labeler head in alignment with a predetermined location on the body;
contacting said body with said support sheet and said component while maintaining said alignments;
following said contacting, removing said support sheet from said body.

15. The method of claim 14 further comprising following said contacting, mounting said component to said body.

16. Method for assembling a critically positioned component on a larger body, said method comprising the steps of:
directing gas through a plurality of bores in a labeler head to form a plurality of jets of gas, said labeler head having a support surface, said bores extending through said support surface;
presenting at least a portion of a thin, flexible support sheet having a display side and a back side opposite said display side, along a path of movement across said support surface to permit said jets to engage said display side and draw said support sheet toward and across said support surface;
releasing said support sheet to enable said support sheet to move with said film of gas across said support surface;
stopping movement of said support sheet across said support surface against at least one stop abutment, at least a portion of said jets issuing from said bores at least partially toward said stop abutment to cause said support sheet, after said releasing, to reposition from said path of movement against said abutment, all of said portion of said jets being covered by said support sheet when said support sheet is positioned against said abutment;
following said stopping, joining the component to a predetermined attachment area of said support sheet;
holding said support sheet on said film of gas at said abutment in a position for accurate application to said body; and
contacting said body with said support sheet and said component.

17. The method of claim 16 wherein said bores are angled with respect to said support surface and arranged in an array so that jets of gas issuing from said array will cause said support sheet to be drawn toward and across said support surface when said support sheet is presented to said support surface and said display side is brought into close proximity of said jets, thereby causing a zone of reduced gas pressure to be formed between said support surface and said display side and establishing a pressure differential across said support sheet to hold said support sheet on a thin film of gas flowing between said support surface and said display side.

18. The method of claim 16 wherein said directing step takes place after said presenting step.

19. The method of claim 16 further comprising directing gas through said a second plurality of bores in said labeler head to blow said back side into contact with said body.

20. The method of claim 19 further comprising, after said directing step, applying vacuum through said labeler head to hold said support sheet to said support surface; and after said moving step, applying pressurized gas through said labeler head to blow said support sheet against said body.

21. Method for assembling a critically positioned component on a camera body, said method comprising the steps of:
joining the component and a predetermined attachment area of a support sheet;
prior to said joining, floating said support sheet into alignment with a labeler head;
positioning said labeler head in alignment with a predetermined location on the body;
contacting said camera body with said support sheet and said component while maintaining said alignments; and
maintaining said camera light-tight during said joining, floating, positioning, and contacting steps.

22. A method for assembling a critically positioned component on a larger body, said method comprising the steps of:
floating a support sheet into alignment with a labeler head, said support sheet being joined, at a predetermined attachment area, to said component;
positioning said labeler head in alignment with a predetermined location on the body;
contacting said body with said support sheet and said component while maintaining said alignments; and
following said contacting, removing said support sheet from said body.

23. A method for assembling a critically positioned component on a camera, said method comprising the steps of:
floating a support sheet into alignment with a labeler head, said support sheet being joined, at a predetermined attachment area, to said component;
positioning said labeler head in alignment with a predetermined location on the body;
contacting said camera body with said support sheet and said component while maintaining said alignments; and
maintaining said camera light-tight during said joining, floating, positioning, and contacting steps.

24. A method for assembling a critically positioned component on a larger body, said method comprising the steps of:
floating a support sheet into alignment with a labeler head;
joining the component and a predetermined attachment area of said support sheet while said support sheet is in said alignment with said labeler head;
positioning said labeler head in alignment with a predetermined location on the body;
contacting said body with said support sheet and said component while maintaining said alignments;
mounting said component to said body; and
following said mounting, removing said support sheet from said body.

25. A method for assembling a critically positioned component on a camera, said method comprising the steps of:
floating a support sheet into alignment with a labeler head;
joining the component and a predetermined attachment area of said support sheet while said support sheet is in said alignment with said labeler head;
positioning said labeler head in alignment with a predetermined location on the body of said camera;
contacting said camera body with said support sheet and said component while maintaining said alignments; and
maintaining said camera light-tight during said joining, floating, positioning, and contacting steps.

26. A method for assembling a critically positioned component on a larger body, said method comprising the steps of:

floating a support sheet into a predetermined position on a labeler head;

positioning said labeler head in predetermined relation to said component;

pressing said support sheet against said component while maintaining said predetermined position and said predetermined relation;

adhering said component to said support sheet, during said pressing;

following said adhering, positioning said labeler head in alignment with a predetermined location on the body;

pressing said support sheet and said component against said body while maintaining said alignment.

27. The method of claim 26 further comprising retaining said support sheet on said body following said contacting.

28. The method of claim 26 wherein said floating further comprises directing gas through a plurality of bores in said labeler head to form jets and combining said jets to form a film of flowing gas.

29. The method of claim 26 further comprising following said pressing, removing said support sheet from said workpiece.

30. A method for assembling a component on a workpiece having a subsystem requiring an operative connection to said component, said method comprising the steps of:

floating a support sheet into alignment with a labeler head, said support sheet being joined, at a predetermined attachment area, to said component;

positioning said labeler head in alignment with a predetermined location on the workpiece, wherein said component is aligned with said subsystem;

pressing said support sheet against said workpiece while maintaining said alignments, wherein said component operatively connects to said subsystem.

31. The method of claim 30 further comprising following said pressing, removing said support sheet from said workpiece.

32. The method of claim 30 further comprising permanently adhering said support sheet to said workpiece.

* * * * *